US009772167B2

(12) United States Patent
Bottiglieri et al.

(10) Patent No.: US 9,772,167 B2
(45) Date of Patent: Sep. 26, 2017

(54) ARMOR COMPONENT

(71) Applicant: Saint-Gobain Ceramics & Plastics, Inc., Worcester, MA (US)

(72) Inventors: Stephen Bottiglieri, Northbridge, MA (US); Abhaya K. Bakshi, Westford, MA (US)

(73) Assignee: Saint-Gobain Ceramics and Plastics, Inc., Worcester, MA (US)

( * ) Notice: Subject to any disclaimer, the term of this patent is extended or adjusted under 35 U.S.C. 154(b) by 133 days.

(21) Appl. No.: 14/597,014

(22) Filed: Jan. 14, 2015

(65) Prior Publication Data
US 2016/0238348 A1 Aug. 18, 2016

Related U.S. Application Data

(60) Provisional application No. 61/927,160, filed on Jan. 14, 2014.

(51) Int. Cl.
*C04B 35/58* (2006.01)
*F41H 5/02* (2006.01)
(Continued)

(52) U.S. Cl.
CPC ......... *F41H 5/023* (2013.01); *C04B 35/5805* (2013.01); *C04B 35/6261* (2013.01); *C04B 35/645* (2013.01); *F41H 5/0414* (2013.01); *C04B 2235/3208* (2013.01); *C04B 2235/3804* (2013.01); *C04B 2235/3826* (2013.01); *C04B 2235/5436* (2013.01); *C04B 2235/5445* (2013.01); *C04B 2235/6562* (2013.01);
(Continued)

(58) Field of Classification Search
CPC ............. C04B 35/5808; C04B 35/5805; F41H 5/0414; F41H 5/00; F41H 5/02
See application file for complete search history.

(56) References Cited

U.S. PATENT DOCUMENTS

| 3,730,826 A | 5/1973 | Matchen et al. |
| 3,894,850 A | 7/1975 | Kovalchuk et al. |

(Continued)

FOREIGN PATENT DOCUMENTS

CN          103641480     *  3/2014

OTHER PUBLICATIONS

Dutta, Sunil K. "Hot Pressing, Strength and Fracture of Calcium Hexaboride." 75th Annual Meeting of the American Ceramic Society, Cincinnati, Ohio. May 1, 1973. 2 pages.
(Continued)

*Primary Examiner* — Karl Group
(74) *Attorney, Agent, or Firm* — Abel Law Group, LLP; Robert N Young

(57) ABSTRACT

An armor component including a body having a first portion including calcium boride compounds include non-stoichiometric calcium boride ($CaB_x$) and stoichiometric calcium boride ($CaB_6$) and having a density of at least about 80% theoretical density. In one aspect, the first portion can include a first phase comprising silicon carbide (SiC) and a second phase comprising calcium boride ($CaB_6$). In another aspect, the first portion can further include a third phase comprising boron carbide ($B_4C$).

16 Claims, 4 Drawing Sheets

(51) Int. Cl.
*F41H 5/04* (2006.01)
*C04B 35/626* (2006.01)
*C04B 35/645* (2006.01)

(52) U.S. Cl.
CPC .. *C04B 2235/6567* (2013.01); *C04B 2235/77* (2013.01); *C04B 2235/785* (2013.01); *C04B 2235/786* (2013.01); *C04B 2235/79* (2013.01); *C04B 2235/80* (2013.01); *C04B 2235/96* (2013.01)

(56) References Cited

U.S. PATENT DOCUMENTS

| | | | |
|---|---|---|---|
| 4,017,577 A | 4/1977 | Dutta | |
| 5,252,267 A | 10/1993 | Holcombe et al. | |
| 5,443,770 A | 8/1995 | Krstic et al. | |
| 5,744,411 A | 4/1998 | Zhao et al. | |
| 6,347,446 B1 | 2/2002 | Luthra et al. | |
| 6,995,103 B2 | 2/2006 | Aghajanian | |
| 8,105,967 B1 | 1/2012 | Martin | |
| 2001/0053645 A1 | 12/2001 | Henderson | |
| 2013/0333549 A1 | 12/2013 | Ninos et al. | |

OTHER PUBLICATIONS

Zheng, S. et al. "Synthesis of Calcium Hexaboride Powder via the Reaction of Calcium Carbonate with Boron Carbide and Carbon." J. Am. Ceram. Soc. vol. 84, No. 11, 2001. Abstract Only.
International Search Report for PCT/US2015/011429 dated Apr. 25, 2015, 3pgs.

\* cited by examiner

601

701

ARMOR COMPONENT

CROSS-REFERENCE TO RELATED APPLICATION

This application claims priority under 35 U.S.C. §119(e) to U.S. Patent Application No. 61/927,160 entitled "ARMOR COMPONENT," by Bottiglieri et al., filed Jan. 14, 2014, which is assigned to the current assignee hereof and incorporated herein by reference in its entirety.

FIELD OF THE DISCLOSURE

The following is directed to armor components, and particularly, armor components comprising calcium boride compounds.

DESCRIPTION OF THE RELATED ART

Armor and other protective materials are usually formed from a series of components, each comprising a plurality of layers of one or more different materials. Such materials, such as ceramics, are typically used for their preferential mechanical characteristics, such as, for example, hardness and density. Materials such as, for example, silicon carbide and boron carbide, have been previously employed in body armor plates. Still, there is a need in the art for improved armor components.

SUMMARY

According to one aspect, an armor component includes a body including a first portion including at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

In yet another aspect, a method for forming an armor component includes hot pressing a mixture comprising a raw material to form a first portion of a body comprising at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

In yet another aspect, an armor component includes a body having a first portion including a first phase comprising silicon carbide (SiC), wherein the first phase has an average grain size (GS1) of not greater than about 6 microns, a second phase comprising calcium boride ($CaB_6$), wherein the second phase has an average grain size (GS2) of not greater than GS1, and a density of at least about 80% theoretical density.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
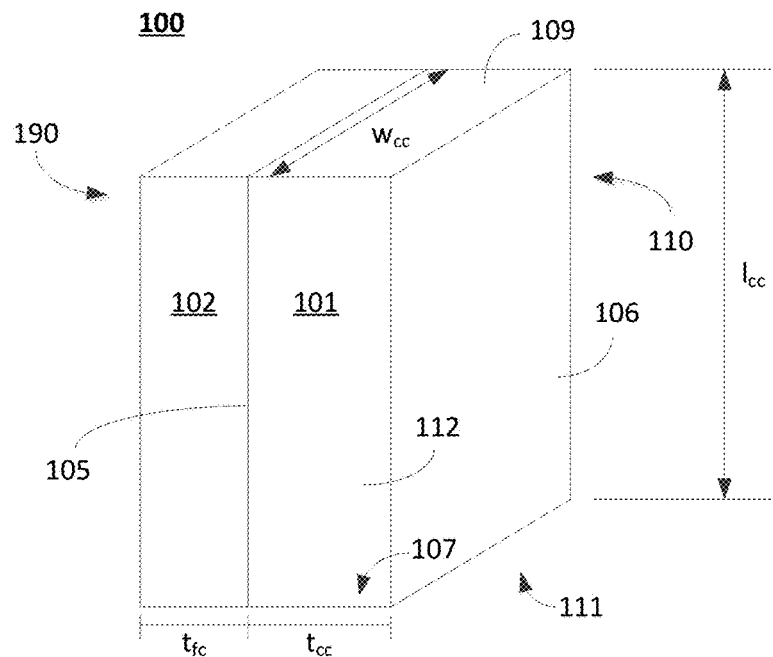
FIG. 1 includes a perspective illustration of a portion of an armor component in accordance with an embodiment.

The following is directed to processes that may be suitable for forming ceramic components including calcium boride compounds, which may be useful in a variety of applications, including, for example, armor components. Armor components including essentially calcium boride compounds can be monolithic articles. In other embodiments, the armor components of the embodiments herein may be composite materials including calcium boride and some content of another material, including for example, a carbide.

Calcium Boride-Containing Material

In one aspect, a method for making an armor component can be initiated at a first step that includes providing a raw material, which may be in the form of a dry powder and include some content of a ceramic material. In particular instances, the raw material can include calcium boride compounds (e.g., $CaB_6$). According to one embodiment, the raw material can include at least a majority content of calcium boride compounds, such as at least about 55 wt % calcium boride compounds for the total weight of the raw material. In other instances, the content of calcium boride compounds in the raw material can be greater, such as at least about 70 wt %, at least about 80 wt %, or even at least about 90 wt % calcium boride compounds for the total weight of the raw material. In particular instances, the calcium boride compounds may include a majority content of stoichiometric calcium boride ($CaB_6$), and more particularly, may consist essentially of stoichiometric calcium boride ($CaB_6$).

In some instances, the raw material may be milled to obtain a particular particle size distribution, which may facilitate the formation of the materials according to the embodiments herein. For example, the raw material may be milled using a milling media comprising calcium boride ($CaB_6$). Milling the raw material may be conducted to change the average particle size of the raw material. For example, milling the raw material may be conducted to reduce the average particle size of the raw material by at least about 5% from the original average particle size of the raw material prior to milling.

In one embodiment, the raw material may be milled using a milling media comprising silicon carbide (SiC). Milling with silicon carbide (SiC) may impart a certain content of silicon carbide (SiC) to the raw material. For example, according to some embodiments discussed herein, milling with silicon carbide (SiC) may impart a content of up to about 35 wt % of silicon carbide (SiC) for a total weight of the raw material.

According to one embodiment, milling may be conducted such that the raw material comprises an average particle size of not greater than about 6 microns, such as not greater than about 5 microns, not greater than about 4 microns, not greater than about 3 microns, or even not greater than about 2 microns. Still, in at least one embodiment, the raw material may have an average particle size after milling of at least about 0.01 microns.

Milling may be done by creating a wet mixture with the raw material and deionized water. Some other additives may be added to the wet mixture to control the rheology and pH, including for example, ammonia, styrene maleic anhydride, and anti-foaming agents, such as Dow Corning 1430. For example, the wet mixture can have a pH that is basic. In more particular instances, the wet mixture can have a pH of at least about 8, such as at least about 9, or even at least about 10.

After milling the raw material may be further sorted. Exemplary sorting methods can include sieving. According to one embodiment, the raw material can be sorted such that the raw material has an average particle size (D50) of not greater than about 6 microns, and a D90 of not greater than about 20 microns. In other instances, the D90 of the raw material after sorting can be not greater than about 18 microns, such as not greater than about 17 microns, not greater than about 16 microns, not greater than about 15 microns, not greater than about 14 microns, not greater than about 13 microns, not greater than about 12 microns, not greater than about 11 microns, not greater than about 10 microns, not greater than about 9 microns, not greater than about 8 microns, not greater than about 7 microns, not greater than about 6 microns, not greater than about 5 microns, or even not greater than about 4 microns.

In certain instances, the raw material may have limited contents of certain elements and/or compounds that can facilitate the formation of an armor component according to the embodiments herein. For example, the raw material can have an oxygen content of not greater than about 8% for the total weight of the raw material. In other instances, the content of oxygen can be less, such as not greater than about 7%, not greater than about 6%, not greater than about 5%, or even not greater than about 4%.

Moreover, according to one embodiment, the raw material can have a limited carbon content, such as a carbon content of not greater than about 8% for the total weight of the raw material. In other instances, the carbon content may be not greater than about 7%, such as not greater than about 6%, not greater than about 5%, or even not greater than about 4%.

According to another embodiment, the raw material can have a particular silicon carbide (SiC) content, such as a silicon carbide (SiC) content of at least 8% for the total weight of the raw material, such as at least about 10%, at least about 15%, at least about 20%, at least about 25%, or even at least about 30%. In a non-limiting embodiment, the raw material can have a silicon carbide (SiC) content of not greater than about 35% for the total weight of the raw material.

In some instances, the raw material can have a particular boron carbide ($B_4C$) content, such as a boron carbide ($B_4C$) content of at least 5% for the total weight of the raw material, such as at least about 10%, or even at least about 15%. In a non-limiting embodiment, the raw material can have a boron carbide ($B_4C$) content of not greater than about 25% for the total weight of the raw material, such as not greater than about 20%.

After preparing the raw material, the body may undergo an optional green body formation process. Such green body forming processes can include, but are not limited to, casting, pressing, molding, drying, printing, punching, and a combination thereof. In particular, the body may undergo a densification process that may include, for example, pressureless sintering, spark plasma sintering, and flash sintering.

In certain embodiments, the raw material or green body (if the green body is first formed) can be further formed via hot pressing. The raw material may be hot pressed according to a particular process that may facilitate the formation of an armor component having the features of the embodiments herein. According to one particular embodiment, the hot pressing operation may include different stages, wherein different heating rates, different atmospheres, and/or different hold temperatures may be utilized between different stages. In one particular embodiment, the hot pressing operation may be initiated by a first heating of the mixture of raw material (or the green body) at a first ramp rate of at least about 2° C./min. In more particular instances, the first ramp rate may be within a range between about 2° C./min and about 15° C./min, such as within a range between about 2° C./min and about 8° C./min.

The hot pressing process, including the entirety of the hot pressing process may be conducted in an inert atmosphere, which may utilize a noble gas, including but not limited to argon.

After heating the raw material at a suitable first ramp rate, the hot pressing operation may conduct a first hold for a duration of at least about 10 minutes at a first hold temperature within a range between about 500° C. and about 700° C. In other instances, the first hold duration can be at least about 15 minutes, such as at least about 20 minutes, or even within a range between about 20 minutes and about 50 minutes. Moreover, the first hold temperature may be within a range between about 525° C. and about 675° C., such as within a range between about 550° C. and about 650° C.

After conducting the first hold, the hot pressing operation may continue by increasing the temperature during a second heating of the mixture from the first hold temperature to a second hold temperature. In particular instances, the second heating can include a second heating ramp rate of at least about 10° C./min, and more particularly within a range between about 10° C./min and about 30° C./min, or even within a range between about 15° C./min and about 25° C./min.

After heating the raw material at a suitable second ramp rate, the hot pressing operation may conduct a second hold for a duration of at least about 30 minutes at a second hold temperature within a range between about 1200° C. and about 1600° C. In other instances, the second hold duration can be at least about 40 minutes, such as at least about 60 minutes, at least about 90 minutes, or even within a range between at least about 90 minutes and not greater than about 300 minutes. Moreover, the second hold temperature may be within a range between about 1250° C. and about 1550° C., such as within a range between about 1300° C. and about 1500° C.

After conducting the second hold, the hot pressing operation may continue by increasing the temperature during a third heating of the mixture from the second hold temperature to a third hold temperature. In particular instances, the third heating can include a third heating ramp rate of at least about 2° C./min, and more particularly within a range between about 2° C./min and about 15° C./min, or even within a range between about 5° C./min and about 12° C./min.

After heating the raw material at a suitable third ramp rate, the hot pressing operation may conduct a third hold for a duration of at least about 30 minutes at a third hold temperature within a range between about 1500° C. and about 1800° C. In other instances, the third hold duration can be at least about 40 minutes, such as at least about 60 minutes, at least about 90 minutes, or even within a range between at least about 90 minutes and not greater than about 300 minutes. Moreover, the third hold temperature may be within a range between about 1550° C. and about 1750° C., such as within a range between about 1600° C. and about 1700° C.

In some embodiments, particularly embodiments having a raw material including silicon carbide (SiC) or boron carbide ($B_4C$), the hot pressing operation, including the entirety of the hot pressing process, may be conducted at a temperature of not greater than about 1400° C., such as not greater than about 1350° C., or even not greater than about 1300° C. For example, the hot pressing operation may include one or more holding operations at a temperature within a range of about 1200° C. to about 1400° C., or even within a range of about 1250° C. to about 1350° C. Notably, it was surprisingly discovered that embodiments formed from a raw material including silicon carbide (SiC) and calcium boride ($CaB_6$) can exhibit a eutectic in which the sintering temperature of the raw material including silicon carbide (SiC) and calcium boride ($CaB_6$) can be lower than the sintering temperature of either the silicon carbide (SiC) or the calcium boride ($CaB_6$) alone. Moreover, it was surprisingly discovered that embodiments formed from a raw material including silicon carbide (SiC) and calcium boride (CaB6) can exhibit melting if sintered at temperatures above about 1400° C.

In accordance with embodiments having a raw material including silicon carbide (SiC) and calcium hexaboride ($CaB_6$) a sintering or hot pressing operation can cause a reaction between the silicon carbide (SiC) and calcium hexaboride ($CaB_6$) to form boron carbide ($B_4C$).

It is believed that the stoichiometric reaction between silicon carbide (SiC) and calcium hexaboride ($CaB_6$) is according to the following formula:

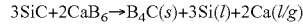

$$3SiC + 2CaB_6 \rightarrow B_4C(s) + 3Si(l) + 2Ca(l/g)$$

As will be appreciated, hot pressing may utilize some content of pressure. The pressure can be applied at different times with the process. For example, the pressure can be applied prior to heating, during any one of the heating steps (e.g. the first heating process or the first hold), or even after completing the heating. In a certain instance, the pressure can be applied at the highest hold temperature. According to one particular embodiment, after completing the heating process (e.g., after conducting the third or highest temperature heating step and during the third or highest temperature hold) a pressure of at least about 1000 psi may be applied to the raw material. In other instances, the pressure may be greater, such as at least about 1500 psi, or even at least about 2000 psi. For at least one embodiment, the pressure may be within a range between about 1000 psi and about 5000 psi, such as within a range between about 1500 psi and about 4500 psi, between about 2000 psi and about 4500 psi, or even between about 3000 psi and about 4500 psi. in at least one particular embodiment, the pressure may be at least about 3500 psi and not greater than about 4500 psi.

After conducting the heating processes, the hot pressed article may be cooled. Cooling may be conducted by allowing the sample to naturally cool (i.e., removing the heat) or by active cooling, such as by quenching the sample by applying a cooler material.

Figure 2:
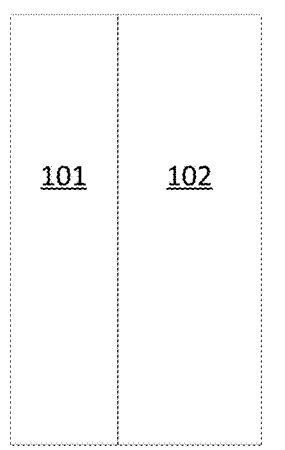
FIG. 2 includes a cross-sectional illustration of a portion of an armor component in accordance with an embodiment.

According to one aspect, the foregoing process can facilitate the formation of a monolithic body, which may be useful in armor components. FIG. 1 includes a perspective view illustration of an armor component 100 in accordance with an embodiment. As illustrated, the armor component 100 can include a first portion 101 and a second portion 102 adjacent the first portion 101. In particular instances, the second portion 102 may overlie the first portion 101. In other embodiments, it will be appreciated that the second portion 102 may have a particular position relative to the first portion 101. For example, as illustrated in FIG. 2, the second portion 102 may underlie the first portion 101. In certain instances, the second portion 102 can be coupled to the first portion 101. Moreover, the second portion 102 can be in direct contact with the first portion 101. The second portion 102 may include a material selected from the group consisting of an organic material, an inorganic material, and a combination thereof.

Figure 3:
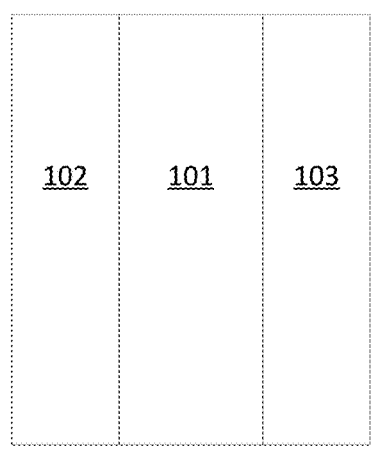
FIG. 3 includes a cross-sectional illustration of a portion of an armor component in accordance with an embodiment.

As further illustrated in FIG. 3, another construction of the armor component 100 can include a first portion 101 disposed between a second portion 102 and a third portion 103. It will be appreciated that various suitable arrangements of the first portion 101 relative to other components (e.g., the second portion 102 and the third portion 103) are contemplated and within the scope of the embodiments described herein. Moreover, it will be appreciated, that while the armor component 100 is shown as having multiple portions, the body of the armor component 100 can consist essentially of the first portion 101.

Referring again to FIG. 1, the armor component 100 can have a body 190, which includes a first portion 101. As further illustrated, the first portion 101 can have a length ($l_{cc}$), a width ($w_{cc}$), and a thickness ($t_{cc}$). As illustrated, the length ($l_{cc}$) may define the longest dimension of the body of the first portion 101. The width ($w_{cc}$) may extend in a direction perpendicular to the length ($l_{cc}$) and can define a second longest dimension of the body of the first portion 101. Furthermore, in one embodiment, the thickness ($t_{cc}$) of the body of the first portion 101 can extend in a direction perpendicular to the plane defined by the width ($w_{cc}$) and length ($l_{cc}$) of the body 190, and may further define the smallest dimension of the body of the first portion 101. In at least one embodiment, the first portion 101 can have a width ($w_{cc}$) that may be greater than the thickness ($t_{cc}$), and a length ($l_{cc}$) may be greater than the width ($w_{cc}$).

As illustrated in FIG. 1, the body 190 of the first portion 101 may define a generally polygonal structure. For example, the body 190 of the first portion 101 can include a first major surface 105 defining an interface between the first portion 101 and second portion 102, a second major surface 106 spaced apart from the first major surface 105 by the dimension of thickness ($t_{cc}$). As will be appreciated, the first major surface 105 and second major surface 106 of the body of the first portion 101 may be defined generally by the dimensions of length and width of the first portion 101. As further illustrated, the first portion 101 can include side surfaces 109, 110, 111, and 112 extending between the first major surface 105 and second major surface 106 and further defining the thickness ($t_{cc}$) of this first portion 101.

In accordance with an embodiment, the first portion 101, and therefore, the body 190, can have a two-dimensional shape. In accordance with an embodiment, and further as illustrated in FIG. 1, the first portion 101, and therefore, the body 190 or at least a portion of the body 190, can be in the form of a layer. Furthermore, the first portion 101 can be a layer having a first major surface 105 and second major surface 106 defining a particular polygonal two-dimensional shape. In particular, the length and width of the first portion 101, and thus at least a portion of the body 190, can define a particular two-dimensional shape, such as a polygon, ellipsoid, circle, indicia, Roman numeral, Roman alphabet character, Kanji character, and a combination thereof. It will be appreciated that the first portion 101 can have a two-dimensional shape in the plane defined by the length and width of the first portion 101 having any suitable or desirable two-dimensional shape.

In accordance with another embodiment, the first portion 101, thus at least a portion of the body 190 of the armor component 100, can have a two-dimensional shape including at least four (4) distinct sides, such as, for example, a trapezoidal shape. In at least another embodiment, the first portion 101, at least a portion of the body 190 of the armor component 100, can have a shape including at least six (6) distinct sides. For example, as illustrated in FIG. 1, the first portion 101 can be in the form of a generally cube-like shape including six (6) distinct sides including the first major surface 105, a second major surface 106, and the side surfaces 109, 110, 111, and 112. It will be appreciated, however, that in other embodiments, the first portion 101, and thus at least a portion of the body 190 of the armor component 100, can include a greater number of sides, including at least about 7 distinct sides, at least about 8 distinct sides, at least about 9 distinct sides, or even at least about 10 distinct sides.

In accordance with one embodiment, the first portion 101 can have any suitable shape for use as an armor component. For example, the first portion 101 may have a standardized SAPI torso plate shape. In other embodiments, the first portion 101 can be formed to have a standardized tessellated tile shape. It will be appreciated that any other shape suitable for use as an armor component may be utilized.

In one embodiment, the first portion 101 can include a monolithic body formed according to the embodiments herein. Notably, the first portion can include at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

In accordance with an embodiment, the first portion 101 may have a content of calcium boride compounds of at least about 91 wt % for the total weight of the first portion. In another embodiment, the first portion 101 can include at least about 92 wt %, at least about 93 wt %, at least about 94 wt %, at least about 95 wt %, at least about 96 wt %, at least about 97 wt %, at least about 98 wt %, or even at least about 99 wt %. In accordance with another embodiment, the first portion 101 can consist essentially of calcium boride compounds. More particularly, in one embodiment, the calcium boride compounds can consist essentially of non-stoichiometric calcium boride ($CaB_x$) and stoichiometric calcium boride ($CaB_6$), and the first portion 101 can consists consist essentially of non-stoichiometric calcium boride ($CaB_x$) and stoichiometric calcium boride ($CaB_6$).

In accordance with another embodiment, the first portion 101 may have a content of calcium boride compounds of at least about 10 wt %, such as at least about 15 wt %, at least about 20 wt %, or even at least about 25 wt %. In a non-limiting embodiment, the first portion 101 may have a content of calcium boride compounds of not greater than about 50 wt %, such as not greater than about 40 wt % or even not greater than about 30 wt %. In one aspect, the first portion 101 may have a content of calcium boride compounds that is a minority phase of the total content of compounds of the first portion 101. For at least one embodiment, the content of calcium boride compounds can be within a range of about 10 wt % to about 25 wt %, or even within a range of about 15 wt % to about 20 wt %.

In accordance with an embodiment, the first portion 101 may have a content of boron carbide (B4C) of at least about 4 wt %, such as at least about 5 wt %, at least about 10 wt %, at least about 15 wt %, at least about 20 wt %, at least about 25 wt %, at least about 30 wt %, at least about 35 wt %, or even at least about 40 wt %. In a non-limiting embodiment, the first portion 101 may have a content of boron carbide (B4C) of not greater than about 50 wt %, such as not greater than about 45 wt %, not greater than about 40 wt %, not greater than about 35 wt %, not greater than about 30 wt %, or even not greater than about 25 wt %. It will be appreciated that the first portion 101 may have a content of boron carbide (B4C) within a range of any minimum or maximum value noted above. It is noted that in embodiments including silicon carbide (SiC) and calcium boride (CaB6) in the pre-sintered raw material, at least a portion of the B4C present in the post-sintered first portion 101 can be formed during a sintering process, as discussed herein.

In certain instances, the first portion 101 can include at least about 0.1 vol % non-stoichiometric calcium boride ($CaB_x$) for a total volume of the first portion 101. In other embodiments, the first portion 101 can include at least about 0.5 vol %, such as at least about 0.8 vol %, at least about 1 vol %, at least about 1.5 vol %, at least about 2 vol %, at least about 2.5 vol %, at least about 3 vol %, at least about 3.5 vol %, at least about 4 vol %, at least about 4.5 vol %, at least about 5 vol %, at least about 5.5 vol %, at least about 6 vol %, at least about 6.5 vol %, at least about 7 vol %, at least about 7.5 vol %, at least about 8 vol %, at least about 8.5 vol %, at least about 9 vol %, at least about 9.5 vol %, at least about 10 vol %, at least about 11 vol %, at least about 12 vol %, at least about 13 vol %, at least about 14 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 99 vol % non-stoichiometric calcium boride ($CaB_x$) for the total volume of the first portion 101. Still, in other instances, the first portion 101 can include a content of non-stoichiometric calcium boride ($CaB_x$) that is not greater than about 99 vol %, such as not greater than about 95 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 28 vol %, not greater than about 25 vol %, not greater than about 22 vol %, not greater than about 20 vol %, not greater than about 18 vol %, not greater than about 16 vol %, not greater than about 15 vol %, not greater than about 14 vol %, not greater than about 13 vol %, not greater than about 12 vol %, not greater than about 11 vol %, not greater than about 10 vol %, not greater than about 9 vol %, not greater than about 8 vol %, not greater than about 7 vol %, not greater than about 6 vol %, not greater than about 5 vol %, not greater than about 4 vol % for the total volume of the first portion 101. It will be appreciated that the content of non-stoichiometric calcium boride ($CaB_x$) within the first portion 101 can be within a range between any of the above minimum and maximum values. Moreover, it will be appreciated that while reference to the foregoing is in volume percent, the same percentages and range of percentages may be valid for weight percent of the non-stoichiometric calcium boride ($CaB_x$) for the total weight of the first portion 101.

In certain instances, the first portion 101 can include at least about 0.1 vol % stoichiometric calcium boride ($CaB_6$) for a total volume of the first portion 101. In other embodiments, the first portion 101 can include at least about 0.5 vol %, such as at least about 0.8 vol %, at least about 1 vol %, at least about 1.5 vol %, at least about 2 vol %, at least about 2.5 vol %, at least about 3 vol %, at least about 3.5 vol %, at least about 4 vol %, at least about 4.5 vol %, at least about 5 vol %, at least about 5.5 vol %, at least about 6 vol %, at least about 6.5 vol %, at least about 7 vol %, at least about 7.5 vol %, at least about 8 vol %, at least about 8.5 vol %, at least about 9 vol %, at least about 9.5 vol %, at least about 10 vol %, at least about 11 vol %, at least about 12 vol %, at least about 13 vol %, at least about 14 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 99 vol % stoichiometric calcium boride ($CaB_6$) for the total volume of the first portion 101. Still, in other instances, the first portion 101 can include a content of stoichiometric calcium boride ($CaB_6$) that is not greater than about 99 vol %, such as not greater than about 95 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 28 vol %, not greater than about 25 vol %, not greater than about 22 vol %, not greater than about 20 vol %, not greater than about 18 vol %, not greater than about 16 vol %, not greater than about 15 vol %, not greater than about 14 vol %, not greater than about 13 vol %, not greater than about 12 vol %, not greater than about 11 vol %, not greater than about 10 vol %, not greater than about 9 vol %, not greater than about 8 vol %, not greater than about 7 vol %, not greater than about 6 vol %, not greater than about 5 vol %, not greater than about 4 vol % for the total volume of the first portion 101. It will be appreciated that the content of non-stoichiometric calcium boride ($CaB_x$) within the first portion 101 can be within a range between any of the above minimum and maximum values. Moreover, it will be appreciated that while reference to the foregoing is in volume percent, the same percentages and range of percentages may be valid for weight percent of the non-stoichiometric calcium boride ($CaB_x$) for the total weight of the first portion 101.

In accordance with an embodiment, the first portion 101 can have a particular theoretical density. For example, the theoretical density of the first portion 101 can be at least about 81% theoretical density, such as at least about 83% theoretical density, at least about 85% theoretical density, at least about 88% theoretical density, at least about 90% theoretical density, at least about 91% theoretical density, at least about 92% theoretical density, at least about 93% theoretical density, at least about 94% theoretical density, at least about 95% theoretical density, at least about 96% theoretical density, at least about 96.5% theoretical density, at least about 97% theoretical density, at least about 97.5% theoretical density, at least about 98% theoretical density, at least about 98.5% theoretical density, or even at least about 99% theoretical density.

In yet another embodiment, the first portion 101 can have a bulk density of at least about 2.28 g/cm$^3$, such as at least about 2.30 g/cm$^3$, or even at least about 2.32 g/cm$^3$. Still, in another embodiment, the first portion 101 can have a bulk density of not greater than about 3.00 g/cm$^3$, not greater than about 2.90 g/cm$^3$, not greater than about 2.70 g/cm$^3$, not greater than about 2.60 g/cm$^3$. It will be appreciated that the density of the first portion 101 can be within a range between any of the above minimum and maximum values.

In one embodiment, the first portion 101 can have a ratio ($CaB_6$:$CaB_x$) of a content (wt % or vol %) of stoichiometric calcium boride ($CaB_6$) to a content (wt % or vol %) of non-stoichiometric calcium boride ($CaB_x$) of not greater than about 1000:1, such as not greater than about 500:1, not greater than about 300:1, not greater than about 200:1, not greater than about 100:1, not greater than about 95:1, not greater than about 90:1, not greater than about 85:1, not greater than about 80:1, not greater than about 75:1, not greater than about 70:1, not greater than about 65:1, not greater than about 60:1, not greater than about 55:1, not greater than about 50:1, not greater than about 45:1, not greater than about 40:1, not greater than about 35:1, not greater than about 30:1, not greater than about 25:1, not greater than about 20:1, not greater than about 15:1, not greater than about 10:1, not greater than about 5:1, or even not greater than about 1:1. In yet another non limiting embodiment, the first portion 101 can have a ratio ($CaB_6$:$CaB_x$) of a content of stoichiometric calcium boride ($CaB_6$) to a content of non-stoichiometric calcium boride ($CaB_x$) of at least about 1:1, such as at least about 1.5:1, at least about 2:1, at least about 3:1, at least about 4:1, at least about 5:1, at least about 6:1, at least about 7:1, at least about 8:1, at least about 9:1, at least about 10:1, at least about 12:1, at least about 15:1, at least about 18:1, at least about 20:1, at least about 30:1, at least about 40:1, at least about 50:1, at least about 60:1, at least about 70:1, at least about 80:1, at least about 90:1, at least about 100:1, at least about 200:1, at least about 300:1, at least about 400:1, at least about 500:1. It will be appreciated that the ratio can be within a range between any of the minimum and maximum ratios provided above.

For yet another embodiment, the first portion 101 can have a ratio ($CaB_x$:$CaB_6$) of a content (wt % or vol %) of non-stoichiometric calcium boride ($CaB_x$) to a content (wt % or vol %) of stoichiometric calcium boride ($CaB_6$) of not greater than about 1000:1, such as not greater than about 500:1, not greater than about 300:1, not greater than about 200:1, not greater than about 100:1, not greater than about 95:1, not greater than about 90:1, not greater than about 85:1, not greater than about 80:1, not greater than about 75:1, not greater than about 70:1, not greater than about 65:1, not greater than about 60:1, not greater than about 55:1, not greater than about 50:1, not greater than about 45:1, not greater than about 40:1, not greater than about 35:1, not greater than about 30:1, not greater than about 25:1, not greater than about 20:1, not greater than about 15:1, not greater than about 10:1, not greater than about 5:1, or even not greater than about 1:1. In yet another non limiting embodiment, the first portion 101 can have a ratio ($CaB_x$:$CaB_6$) of a content (wt % or vol %) of non-stoichiometric calcium boride ($CaB_x$) to a content (wt % or vol %) of stoichiometric calcium boride ($CaB_6$) of at least about 1:1, such as at least about 1.5:1, at least about 2:1, at least about 3:1, at least about 4:1, at least about 5:1, at least about 6:1, at least about 7:1, at least about 8:1, at least about 9:1, at least about 10:1, at least about 12:1, at least about 15:1, at least about 18:1, at least about 20:1, at least about 30:1, at least about 40:1, at least about 50:1, at least about 60:1, at least about 70:1, at least about 80:1, at least about 90:1, at least about 100:1, at least about 200:1, at least about 300:1, at least about 400:1, at least about 500:1. It will be appreciated that the ratio can be within a range between any of the minimum and maximum ratios provided above.

The first portion 101 can include calcium boride compounds, and at least one of the calcium boride compounds (e.g., stoichiometric calcium boride ($CaB_6$ or non-stoichiometric calcium boride ($CaB_x$)) can have an average grain size of not greater than about 6 microns, such as not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns. In another non-limiting embodiment, at least one of the calcium boride compounds can have an average grain size of at least about 0.1 microns, at least about 0.3 microns, at least about 0.5 microns, at least about 0.7 microns, at least about 0.8 microns, at least about 1 micron.

It will be appreciated that a grain can be made of multiple calcium boride compounds, including for example, stoichiometric calcium boride and non-stoichiometric calcium boride. For example, certain grains of the ceramic material may include both stoichiometric calcium boride and non-stoichiometric calcium boride. More particularly, at least one grain with the material of the first portion, and often, more than one grain of the material of the first portion can have a gradient of stoichiometric calcium boride and non-stoichiometric calcium boride. For example, within a grain, the content of stoichiometric calcium boride may change with the distance from the center of the grain. For example, in one embodiment, the content of stoichiometric calcium boride at the center of the grain can be more prevalent as compared to the content of stoichiometric calcium boride at the grain boundaries. In another embodiment, the content of stoichiometric calcium boride at the center of the grain can be less prevalent as compared to the content of stoichiometric calcium boride at the grain boundaries. Moreover, within a grain, the content of non-stoichiometric calcium boride may change with the distance from the center of the grain. For example, in one embodiment, the content of non-stoichiometric calcium boride at the center of the grain can be more prevalent as compared to the content of non-stoichiometric calcium boride at the grain boundaries. In another embodiment, the content of non-stoichiometric calcium boride at the center of the grain can be less prevalent as compared to the content of non-stoichiometric calcium boride at the grain boundaries.

In certain embodiments, a glassy or vitreous phase of material may exist at the grain boundaries between grains. The glassy phase may include stoichiometric calcium boride and non-stoichiometric calcium boride. In one particular embodiment, the glassy phase at the grain boundary may consists essentially of non-stoichiometric calcium boride.

In certain other embodiments, the first portion 101 can include a material having calcium boride compounds, which can include a crystalline phase and an amorphous phase. The crystalline phase can include stoichiometric calcium boride and non-stoichiometric calcium boride. Moreover, the amorphous phase can include non-stoichiometric calcium boride.

Moreover, in certain aspects, the crystalline phase can include a plurality of crystalline grains having a substantially random orientation relative to each other. A random orientation of crystalline grains may be characterized by a lack of preferential texture or anisotropy in the orientation of the grains with respect to each other.

According to a particular embodiment, the first portion 101 may be formed such that it can have limited contents of certain materials. For example, the first portion 101 may be essentially free of carbon-containing compounds. For example, the first portion 101 may be a monolithic body comprising calcium boride compounds (i.e., $CaB_6$, $CaB_x$) being essentially free of carbon-containing compounds. In particular instances, the first portion 101 may be essentially free of boron carbide ($B_4C$). In another embodiment, the first portion 101 may be essentially free of nitride-containing compounds such as silicon nitride ($Si_3N_4$), essentially free of aluminum and aluminum-containing compounds such as aluminum oxide ($Al_2O_3$), essentially free of yttrium oxide ($Y_2O_3$), even essentially free of titanium or titanium-containing compounds such as titanium diboride ($TiB_2$) or titanium dioxide ($TiO_2$). In particular instances, the first portion 101 may be essentially free of free silicon (Si) or free carbon(C). It will be appreciated that the term "essentially free" as used herein means less than 1 wt % of the total weight of the body, and more particularly, in impurity contents. It will be appreciated that such embodiments are examples, and certain first portions of the embodiments herein can be formed to include the above-mentioned materials.

According to another embodiment, the first portion 101 may be formed such that it can have a particular contents of certain materials. For example, the first portion 101 may include a majority amount of carbon-containing compounds. In a particular embodiment, the first portion 101 may include a majority amount of a combination of silicon carbide (SiC) and boron carbide ($B_4C$). This situation may occur, for example, if silicon carbide (SiC) is utilized for milling calcium boride ($CaB_6$) to prepare the raw material before sintering and forming the first portion 101. In another particular embodiment, the first portion 101 may include a majority amount of boron carbide ($B_4C$). This situation may occur, for example, if boron carbide ($B_4C$) is utilized for milling calcium boride ($CaB_6$) to prepare the raw material before sintering and forming the first portion 101.

In an embodiment, the first portion 101 can have a particular hardness, including, for example, a Mohs hardness of at least about 5, at least about 6, at least about 7, at least about 8, or even at least about 9. In a certain aspect, the first portion 101 can hay a particular hardness, including, for example, a Vickers Hardness measured at 1 kilogram ($HV_{1kg}$) of at least 19 GPa, such as at least 20 GPa, at least 21 GPa, or even at least 22 GPa. In a non-limiting embodiment, the first portion 101 can hay a Vickers Hardness measured at 1 kilogram ($HV_{1kg}$) of not greater than 25 GPa, such as not greater than 23 GPa, or even not greater than 22 GPa. It will be appreciated that the hardness can be within a range between any of the minimum and maximum values provided above.

In a certain aspect, the first portion 101 can hay a particular toughness, including, for example, a Vickers toughness measured at 1 kilogram by the indentation method of at least 5.5 MPa·m$^{1/2}$, such as at least 6.0 MPa·m$^{1/2}$. In a non-limiting embodiment, the first portion 101 can have a Vickers toughness measured at 1 kilogram by the Niihara method of not greater than 7.5 MPa·m$^{1/2}$, such not greater than 7.0 MPa·m$^{1/2}$. It will be appreciated that the hardness can be within a range between any of the minimum and maximum values provided above.

In an embodiment, the first portion 101 can have a particular strength as measured, for example, by the 4-point B-bar method. For example, the first portion 101 can have a strength of at least about 80 MPa, such as at least about 90 MPa, or even at least about 100 MPa. In a non-limiting embodiment, the first portion 101 can have a strength of not greater than about 125 MPa.

Additionally, the first portion 101 can include calcium boride compounds including grains defining a particular grain size distribution. For example, the grains of the first portion 101 can define a generally normal or Gaussian distribution of grain sizes. In other embodiments, the distribution of grain sizes within the first portion 101 can be defined by a multimodal grain size distribution. For example, in one particular instance, the first portion 101 can include grains defining a bimodal grain size distribution, including grains having a fine grain size and a second portion of grains having a course grain size, wherein the course grain size defines a distinct mode of grains having a larger average grain size than the average grain size of the grains having a finer grain size.

In accordance with another embodiment, the first portion 101 can include grains, which when viewed using suitable techniques including, for example, scanning electron microscopy, the grains may have a particular shape. For example, some suitable shapes of at least one of the grains can include a shape of elongated, equiaxed, platelet, irregular, and any combination thereof.

In certain embodiments, the first portion 101 may include an additive material. The additive material may be present in an amount sufficient to facilitate formation of the ceramic component, and particularly in an amount greater than an impurity content. For example, the ceramic component can include a additive, which may be present in an amount of at least about 1 wt %, such as at least about 2 wt %, at least about 5 wt %, or even at least about 10 wt % of the total weight of the body of the first portion 101. However, in certain non-limiting embodiments, the additive may be present in a minority amount, such that it is not greater than about 50 wt % of the total weight of the body of the first portion 101.

Moreover, the ceramic component may include an additive, which may be preferentially disposed at certain regions of the microstructure of the first portion 101. For example, the additive may be substantially uniformly dispersed throughout the volume of the body of the first portion 101. In another instance, the additive may be disposed at the grain boundaries, such that the additive is an intergranular phase disposed between individual grains or domains throughout the body of the first portion 101. In another embodiment, the additive may be in the form of a layer, such as, for example, an additive layer overlying the first portion 101, the second portion 102, or the third portion 103.

In accordance with one particular instance, the additive can include an inorganic or organic material. More particularly, the additive may include an inorganic material, such as a ceramic, and more particularly an oxide. In certain instances, the additive may include silica, and more particularly fumed silica.

As illustrated in FIG. 1, the first portion 101 can have a particular thickness ($t_{cc}$). In accordance with an embodiment, the first portion 101 can have a thickness of at least about 0.01 microns. In other embodiments, the thickness of the ceramic component can be greater, such as at least about 0.1 microns, at least about 1 micron, at least about 5 microns, at least about 10 microns, at least about 20 microns, at least about 30 microns, at least about 50 microns, or even at least about 100 microns. Still, in a non-limiting embodiment, the ceramic component may have a thickness that is not greater than about 20 mm, such as not greater than about 15 mm, not greater than about 12 mm, not greater than about 10 mm, or even not greater than about 5 mm. It will be appreciated that the thickness of the first portion 101 can be within a range between any of the minimum and maximum vales noted above.

As further noted in FIG. 1, the armor component 100 can include a second portion 102 that may be adjacent to the first portion 101. In accordance with an embodiment, the second portion 102 can be abutting at least a portion of the first portion 101, and more particularly, may be in direct contact with a first major surface 105 of the first portion 101. More particularly, the second portion 102 and first portion 101 may be bonded to each other at the first major surface 105 of the first portion 101.

Further, it will be appreciated that the second portion 102 may include a composite material, which may include a combination of materials, including for example natural materials, synthetic materials, organic materials, inorganic materials, and any combination thereof. Some sutiable inorganic materials can include ceramics, metals, glasses, and the like.

In one particular embodiment, the second portion 102 may include a boride, oxide, carbide, nitride, and a combination thereof. In particular instances, the material of the second portion 102 may include one metal element, including, for example, but not limited to, a transition metal element. In certain instances, the metal element may include zirconium (Zr), titanium (Ti), aluminum (Al), and a combination thereof. For example, the second portion 102 may include calcium boride ($CaB_6$), aluminum boride ($AlB_{12}$), magnesium aluminum boride ($MgAlB_2$). In one particular instance, the second portion 102 may include zirconium boride ($ZrB_2$). In still another embodiment, the second portion 102 may include titanium boride ($TiB_2$).

In an alternative embodiment, the second portion 102 may include a composition that is different than the composition of the first portion 101. For example, the second portion 102 may include a composition including a nitride material that is different than the material of the first portion 101. The nitride material of the second portion 102 may include a metal element, and in particular a transition metal element. In particular instances, the second portion 102 may include silicon nitride ($Si_3N_4$), titanium nitride (TiN), aluminium nitride (AlN), silicon carbide (SiC), and a combination thereof.

In accordance with another embodiment, the second portion 102 may include a ceramic material, including an oxide material. In certain instances, the oxide material may include aluminum oxide ($Al_2O_3$), boron oxide ($B_6O$), and a combination thereof. In other instances, the oxide material may include at least one element, including, but not limited to, a transition metal element. For example, some suitable metal elements can include yttrium (Y), lanthanum (La), and a combination thereof. In one particular instance, the second portion 102 can include an oxide material including yttria ($Y_2O_3$). In another embodiment, the second portion 102 can include an oxide material comprising lanthanum oxide ($La_2O_3$).

In still other instances, the second portion 102 may include some natural materials, for example a woven material. In other instances, the second portion 102 may include a non-woven material. Some sutiable examples of woven and non-woven material can include those utilizing a fiber, and more particularly, may include a ballistic fiber. In accordance with an embodiment, the ballistic fiber may include a natural material, synthetic material, and a combination thereof. According to one particular design, the second portion 102 may include a ballistic fiber that includes nylon.

In accordance with an embodiment, the first portion 101 can have a particular thickness ($t_{cc}$) and the second portion 102 may have a particular thickness ($t_{fc}$). In certain instances, the second portion 102 can have a thickness ($t_{fc}$) that is substantially the same as the thickness ($t_{cc}$) as the first portion 101. And yet in another design, the thickness of the first portion 101 can be significantly different than the thickness of the second portion 102. For example, in one embodiment, the first portion 101 can have a thickness that is greater than the second portion 102. Still, it will be appreciated that the first portion 101 can have a thickness that is less than the thickness of the second portion 102.

In particular embodiments, the first portion 101 can have a thickness that is at least about 1% less than the thickness of the second portion 102 as measured by the equation $[(t_{cc}-t_{fc})/t_{cc}]\times100\%$. It will be appreciated that the difference of thickness can be measured as the absolute value of the equation noted herein. In accordance with another embodiment, the first portion 101 can have a thickness that is at least about 2% less than the thickness of the second portion 102, that is, at least about 3% less, at least about 4% less, at least about 5% less, at least about 6% less, at least about 7% less, at least about 8% less, at least about 9% less, at least about 10% less, at least about 12% less, at least about 15% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, at least about 98% less, or even at least about 99% less. In accordance with an embodiment, the first portion 101 can have a thickness that is greater than the thickness of the second portion 102 by not greater than about 99%, such as not greater than about 90%, not greater than about 85%, not greater than about 80%, not greater than about 75%, not greater than about 70%, not greater than about 60%, not greater than about 50%, not greater than about 40%, not greater than about 30%, not greater than about 20%, not greater than about 10%, not greater than about 5%, or even not greater than about 1%. It will be appreciated that the percent difference in thickness between the first portion 101 and second portion 102 can be within a range between any of the minimum and maximum percentages noted above.

In particular embodiments, the second portion 102 can have a thickness that is at least about 1% less than the thickness of the first portion 101 as measured by the equation $[(t_{fc}-t_{cc})/t_{fc}]\times100\%$. It will be appreciated that the difference of thickness can be measured as the absolute value of the equation noted herein. In accordance with another embodiment, the second portion 102 can have a thickness that is at least about 1% less than the thickness of the first portion 101, that is, at least about 2%, that is, at least about 3% less, at least about 4% less, at least about 5% less, at least about 6% less, at least about 7% less, at least about 8% less, at least about 9% less, at least about 10% less, at least about 12% less, at least about 15% less, at least about 20% less, at least about 25% less, at least about 30% less, at least about 35% less, at least about 40% less, at least about 45% less, at least about 50% less, at least about 55% less, at least about 60% less, at least about 65% less, at least about 70% less, at least about 75% less, at least about 80% less, at least about 85% less, at least about 90% less, at least about 95% less, at least about 98% less, or even at least about 99% less. In accordance with an embodiment, the second portion 102 can have a thickness that may be greater than the thickness of the first portion 101 by not greater than about 99%, such as not greater than about 90%, not greater than about 85%, not greater than about 80%, not greater than about 75%, not greater than about 70%, not greater than about 60%, not greater than about 50%, not greater than about 40%, not greater than about 30%, not greater than about 20%, not greater than about 10%, not greater than about 5%, or even not greater than about 1%. It will be appreciated that the percent difference in thickness between the second portion 102 and first portion 101 can be within a range between any of the minimum and maximum percentages noted above.

Furthermore, the first portion 101 may have a first portion density (dfp) and the second portion 102 may have a second portion density (dsp). In particular instances, the first portion density can be substantially the same as the second portion density. In other instances, the first portion density can be significantly different as compared to the second portion density. For example, in one non-limiting embodiments the first portion density may be less than the second portion density. In another embodiment, the first portion density can be greater than the second portion density.

In yet another aspect, the first portion 101 can have a first portion hardness (hfp) and the second portion 102 may have a second portion hardness (hsp). In particular instances, the second portion hardness may be substantially the same as the first portion hardness. Still, in other designs, the first portion hardness can be substantially different that the second portion hardness. For example, in certain instances, the first portion hardness can be greater than the second portion hardness. In another embodiment, the first portion hardness can be less than the second portion hardness.

In another aspect, the armor component 100 may include a third portion 103 that is distinct from the second portion 102 and first portion 101. For example, referring to FIG. 3, the third portion 103 is illustrated as a distinct component relative to second portion 102 and first portion 101. In certain instances, such as illustrated in FIG. 3, the third portion 103 may be in the form of a layer. As such, the third portion 103 can have dimensions substantially similar to the first portion 101 and second portion 102 as described in embodiments herein. As further illustrated, the third portion 103 may be adjacent to the first portion 101. More particularly, the third portion 103 may be overlying the first portion 101. For example, the third portion 103 can be underlying the ceramic component, and more particularly, may be abutting the first portion 101.

It will be appreciated that the third portion 103 can have any of the attributes of the second portion 102 and the first portion 101 described in the embodiments herein.

In certain aspects, the first portion 101 may be a composite including a first material and a second material. In particular, the first material may define a first material phase and the second material may define a second material phase, wherein the first material phase and the second material phase are separate and discrete phases with respect to each other. For example, in at least one embodiment, the first material phase may define a solid phase material, and the second phase material may define a liquid phase material.

Figure 4:
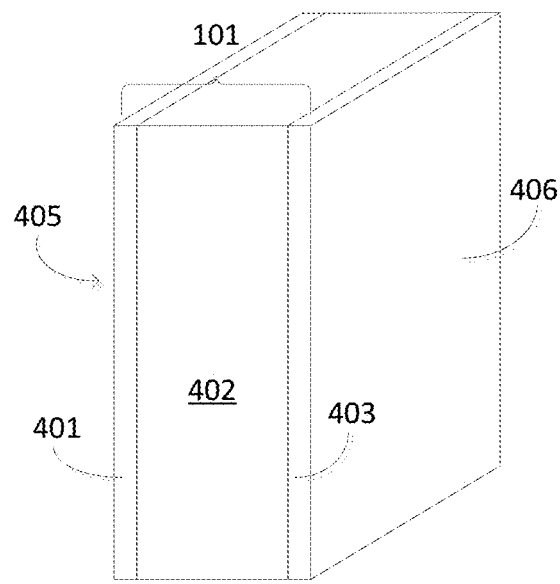
FIG. 4 includes a cross-sectional illustration of a portion of an armor component in accordance with an embodiment.

FIG. 4 includes an illustration of a portion of a first portion 101 as a composite in accordance with an embodiment. Notably, as illustrated, the first portion 101 can include a first component 401 defining a first major surface 405 and a second component 402 adjacent the first component 401. Furthermore, the first portion 101 can include a third component 403 abutting the second component 402 and defining a second major surface 406.

In accordance with an embodiment, the first portion 101 can include a first component 401 defining a first material and second component 402 defining a second material distinct from the first material. As illustrated in FIG. 4, the first component 401 and the second component 402 can define distinct portions of the entire volume of the body of the first portion 101. Notably, in the embodiment in FIG. 4, the first component 401 can extend to define a first major surface 405 while the second component 402 is disposed between the first component 401 and the third component 403.

It will be appreciated that various combinations of component may be utilized to form a composite first portion 101. In particular instances, the first component 401 and second component 402 can define volumes of the entire volume of the body of the composite first portion 101. For example, as illustrated in FIG. 4, the second component 402 can define a majority of the volume of the body of the composite first portion 101 as compared to the first component 401 and third component 403. However, it will be appreciated that in other embodiments, the first component 401 may define a majority of the volume of the entire volume of the body of the composite first portion 101. In particular instances, it will be appreciated that the first volume defined by the first component 401 and the second volume defined by the second component 402 can be substantially the same. Any one or all of the components 401, 402, and 403 may include the material including calcium boride compounds as described in the embodiments herein.

Figure 5:
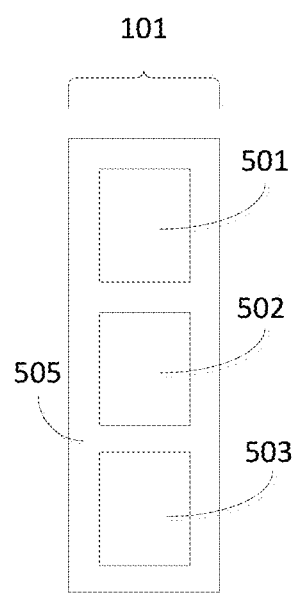
FIG. 5 includes a cross-sectional illustration of a portion of an armor component in accordance with an embodiment.

FIG. 5 includes a cross-sectional illustration of an armor component in accordance with an embodiment. As illustrated, the armor component includes a composite first portion 101 including components 501, 502, and 503, which are spaced apart from each other by a component 505. In particular instances, the components 501, 502, and 503 can be made of one material and the component 505 can include a material having a distinct composition or mechanical characteristic from the first components 501, 502, and 503. In particular instances, the first component 501 and the second component 502 can be arranged in a predetermined distribution relative to each other. For example, the first component 501, second component 502, and third component 503 can define an ordered distribution with respect to each other.

Furthermore, while not illustrated herein, it will be appreciated that various arrangements of components may be utilized to form an armor component. As noted herein, the armor component may utilize first portions and second portions that are distinct from each other. It will be appreciated that it is contemplated that a composite ceramic component of any of the embodiments herein may include a first portion defining a first layer and a second portion defining a second layer that may be in contact with each other, either directly or indirectly. In other embodiments, the first and second portions may be overlying each other, underlying each other, or abutting each other. Moreover, it will be appreciated that any of the portions or components of the objects described herein may be in the form of elongated members that may be interwoven with each other.

In accordance with one aspect, the armor component of the embodiments herein may be utilized in various applications. For example, the armor component may be sewn into an article of clothing. In other embodiments, the armor component may be utilized in a vehicle, a water-based vehicle, an aeronautical vehicle, a building, a shield, and any combination thereof.

Composite Material

According to another aspect, a composite material may be formed, which may include a first phase comprising a ceramic material and a second phase comprising calcium boride ($CaB_6$). According to one particular aspect, the composite material may be formed using generally the same hot pressing process as described herein. Notably, the provision and preparation of the raw material powder may differ as follows. The raw material powder may include a material including calcium boride compounds as described herein. The raw material powder comprising calcium boride may be milled using media comprising a carbide material, such as silicon carbide. Such a milling process may facilitate the inclusion of a carbide material (e.g., silicon carbide) into the raw material powder comprising calcium boride. The milling process may be conducted for a particular amount of time to control the content of the carbide material introduced into the raw material powder comprising calcium boride.

After milling, some content of additive powder may be added to the raw material powder comprising calcium boride compounds to facilitate the formation of a composite material. In one exemplary embodiment, the additive can be a carbon containing material, such as a carbide, and more particularly, may be silicon carbide. The additive may have an average particle size that is the same as described herein with respect to the raw material powder comprising calcium boride.

The raw material powder can be a raw material powder mixture comprising a powder of calcium boride and an additive. The additive can be provided in any amount, including but not limited to at least about 1 wt % based on the total weight of the raw material powder mixture. In other instances, the additive can be present in an amount of at least about 5 wt %, such as at least about 8 wt %, at least about 10 wt %, at least about 15 vol %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, or even at least about 99 wt % for the total weight of the raw material powder mixture. Still, in other instances, the raw material powder mixture can include a content of the additive of not greater than about 99 wt %, such as not greater than about 95 wt %, not greater than about 90 wt %, not greater than about 85 wt %, not greater than about 80 t %, not greater than about 75 wt %, not greater than about 70 wt %, not greater than about 65 wt %, not greater than about 60 wt %, not greater than about 55 wt %, not greater than about 50 wt %, not greater than about 45 wt %, not greater than about 40 wt %, not greater than about 35 wt %, not greater than about 30 wt %, not greater than about 28 wt %, not greater than about 25 wt %, not greater than about 20 wt %, not greater than about 15 wt %, not greater than about 10 wt %, not greater than about 5 wt %, not greater than about 1 wt % for the total weight of the raw material powder mixture. It will be appreciated that the content of the additive in the raw material powder mixture can be within a range between any of the minimum and maximum percentages noted above.

After forming the raw material powder mixture, the mixture can be blended for uniform and homogenous dispersion of the materials within each other. Thereafter, a hot pressing operation can be conducted as described in the embodiments herein.

The article resulting from the hot pressing operation can be a ceramic component including a first phase comprising silicon carbide (SiC), wherein the first phase has an average grain size (GS1) of not greater than about 6 microns and a second phase comprising calcium boride ($CaB_6$), wherein the second phase has an average grain size (GS2) of not greater than GS1. In a particular embodiment, the article can further include a third phase comprising boron carbide ($B_4C$), wherein the third phase has an average grain size (GS3) of not greater than GS1. Moreover, the ceramic component may have a density of at least about 80% theoretical density. The ceramic component can be used as an armor component, and therefore, can have any of the attributes described in the embodiments herein associated with an armor component. Notably, the ceramic component can be part of a first portion of a body of an armor component, and can have any of the features associated with the portions and/or components of an armor component as described herein.

In one embodiment, referring again to the armor component of FIG. 1, the first portion 101 may include the ceramic component such that the first portion includes a first content (C1) of the first phase, which may be measured as weight percent or volume percent of the first portion 101, and a second content (C2) of the second phase, which may be measured as weight percent or volume percent of the first portion 101. According to one embodiment, C1 may be greater than or equal to C2. In more particular instances, the first portion can have a first-to-second content ratio of the first content to the second content (C1:C2), wherein the first-to-second content ratio can be at least about 1.1:1, such as at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, or even at least about 10:1. Still, in a non-limiting embodiment, the first-to-second content ratio can be not greater than about 99:1, such as not greater than about 97:1, not greater than about 95:1, or even not greater than about 93:1, not greater than about 90:1, not greater than about 80:1, not greater than about 70:1, not greater than about 60:1, not greater than about 50:1, no greater than about 40:1, not greater than about 30:1, not greater than about 20:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, not greater than about 1:1. It will be appreciated that the first-to-second content ratio can be within a range between any of the minimum and maximum ratios noted above.

In yet another embodiment, the first portion 101 may include the ceramic component such that the first portion includes a first content (C1) of the first phase, which may be measured as weight percent or volume percent of the first portion 101, and a second content (C2) of the second phase, which may be measured as weight percent or volume percent of the first portion 101. According to one embodiment, C2 may be greater than or equal to C1. In more particular instances, the first portion can have a second-to-first content ratio of the second content to the first content (C2:C1), wherein the second-to-first content ratio can be at least about 1.1:1, such as at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, or even at least about 10:1. Still, in a non-limiting embodiment, the second-to-first content ratio can be not greater than about 99:1, such as not greater than about 97:1, not greater than about 95:1, or even not greater than about 93:1, not greater than about 90:1, not greater than about 80:1, not greater than about 70:1, not greater than about 60:1, not greater than about 50:1, no greater than about 40:1, not greater than about 30:1, not greater than about 20:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, not greater than about 1:1. It will be appreciated that the second-to-first content ratio can be within a range between any of the minimum and maximum ratios noted above.

In another embodiment, the first portion 101 may include the ceramic component such that the first portion includes a first content (C1) of the first phase, which may be measured as weight percent or volume percent of the first portion 101, a second content (C2) of the second phase, which may be measured as weight percent or volume percent of the first portion 101, and a third content (C3) of a third phase, which may be measured as a weight percent or volume percent of the first portion 101. According to one embodiment, C3 may be greater than or equal to C2. In more particular instances, the first portion can have a third-to-second content ratio of the third content to the second content (C3:C2), wherein the third-to-second content ratio can be at least about 1.1:1, such as at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, or even at least about 10:1. Still, in a non-limiting embodiment, the third-to-second content ratio can be not greater than about 99:1, such as not greater than about 97:1, not greater than about 95:1, or even not greater than about 93:1, not greater than about 90:1, not greater than about 80:1, not greater than about 70:1, not greater than about 60:1, not greater than about 50:1, no greater than about 40:1, not greater than about 30:1, not greater than about 20:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, not greater than about 1:1. It will be appreciated that the third-to-second content ratio can be within a range between any of the minimum and maximum ratios noted above.

In another aspect, C3 may be greater than or equal to C1. In more particular instances, the first portion can have a third-to-first content ratio of the third content to the first content (C3:C1), wherein the third-to-second content ratio can be at least about 1.1:1, such as at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, or even at least about 10:1. Still, in a non-limiting embodiment, the third-to-first content ratio can be not greater than about 99:1, such as not greater than about 97:1, not greater than about 95:1, or even not greater than about 93:1, not greater than about 90:1, not greater than about 80:1, not greater than about 70:1, not greater than about 60:1, not greater than about 50:1, no greater than about 40:1, not greater than about 30:1, not greater than about 20:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, not greater than about 1:1. It will be appreciated that the third-to-first content ratio can be within a range between any of the minimum and maximum ratios noted above.

According to one embodiment, the first portion 101 can include a first content (C1) of the first phase of at least about 1 vol % for a total volume of the first portion 101. For example, in other embodiments, C1 can be at least about 5 vol %, such as at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 98 vol % for the total volume of the first portion 101. Still, in another non-limiting embodiment, the first content of the first portion 101 can be not greater than about 99 vol %, such as not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, or even not greater than about 5 vol % for a total volume of the first portion 101. It will be appreciated that the first content can be within a range between any of the minimum and maximum percentages noted above.

In yet another embodiment, the first portion 101 can include a second content (C2) of the second phase of at least about 1 vol % for a total volume of the first portion 101. For example, in other embodiments, C2 can be at least about 5 vol %, such as at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 98 vol % for the total volume of the first portion 101. Still, in another non-limiting embodiment, the second content of the second phase within the first portion 101 can be not greater than about 99 vol %, such as not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, or even not greater than about 5 vol % for a total volume of the first portion 101. It will be appreciated that the second content can be within a range between any of the minimum and maximum percentages noted above.

In yet another embodiment, the first portion 101 can include a third content (C3) of the third phase of at least about 1 vol % for a total volume of the first portion 101. For example, in other embodiments, C3 can be at least about 5 vol %, such as at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 98 vol % for the total volume of the first portion 101. Still, in another non-limiting embodiment, the third content of the third phase within the first portion 101 can be not greater than about 99 vol %, such as not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, or even not greater than about 5 vol % for a total volume of the first portion 101. It will be appreciated that the second content can be within a range between any of the minimum and maximum percentages noted above.

As described herein, first portion 101 may include a composite material including a first phase having a first average grain size (GS1) and a second phase having a second average grain size (GS2), which may facilitate use of the material as an armor component. For example, GS1 can be not greater than about 6 microns, such as not greater than about 5.5 microns, not greater than about 5 microns, not greater than about 4.5 microns, not greater than about 4 microns, not greater than about 3.5 microns, not greater than about 3 microns, not greater than about 2.5 microns, or even not greater than about 2 microns. In a non-limiting embodiment, GS 1 can be at least about 0.1 microns, such as at least about 0.3 microns, at least about 0.5 microns, at least about 0.7 microns, at least about 0.8 microns, or even at least about 1 micron. It will be appreciated that GS 1 can be within a range between any of the minimum and maximum values noted above.

Additionally, the second phase can have an average grain size (GS2) that is not greater than the average grain size of the first phase (GS 1). According to one embodiment, GS2 can be not greater than about 6 microns, such as not greater than about 5.5 microns, not greater than about 5 microns, not greater than about 4.5 microns, not greater than about 4 microns, not greater than about 3.5 microns, not greater than about 3 microns, not greater than about 2.5 microns, or even not greater than about 2 microns. In a non-limiting embodiment, GS2 can be at least about 0.1 microns, such as at least about 0.3 microns, at least about 0.5 microns, at least about 0.7 microns, at least about 0.8 microns, or even at least about 1 micron. It will be appreciated that GS2 can be within a range between any of the minimum and maximum values noted above.

Further, the third phase can have an average grain size (GS3) that is not greater than the average grain size of the first phase (GS1). According to one embodiment, GS3 can be not greater than about 6 microns, such as not greater than about 5.5 microns, not greater than about 5 microns, not greater than about 4.5 microns, not greater than about 4 microns, not greater than about 3.5 microns, not greater than about 3 microns, not greater than about 2.5 microns, or even not greater than about 2 microns. In a non-limiting embodiment, GS3 can be at least about 0.1 microns, such as at least about 0.3 microns, at least about 0.5 microns, at least about 0.7 microns, at least about 0.8 microns, or even at least about 1 micron. It will be appreciated that GS3 can be within a range between any of the minimum and maximum values noted above.

According to one embodiment, the first portion 101 can include a composite material having a particular ratio between the average grain size of the first phase (GS 1) and the average grain size of the second phase (GS2) facilitating the features of the embodiments herein and making the material suitable for use as an armor component. For example, the first portion 101 can have a grain size ratio (GS1:GS2) of at least about 1.1:1, such as at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, or even at least about 10:1. In another non-limiting embodiment, the grain size ratio (GS1:GS2) can be not greater than about 30:1, such as not greater than about 20:1, not greater than about 15:1, not greater than about 12:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, or even not greater than about 1:1. It will be appreciated that the grain size ratio (GS1:GS2) can be within a range between any of the minimum and maximum ratios provided above.

Moreover, in other instances, the first portion 101 can have a grain size ratio (GS2:GS1) of at least about 1.1:1, such as at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, or even at least about 10:1. In another non-limiting embodiment, the grain size ratio (GS1:GS2) can be not greater than about 30:1, such as not greater than about 20:1, not greater than about 15:1, not greater than about 12:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, or even not greater than about 1:1. It will be appreciated that the grain size ratio (GS1:GS2) can be within a range between any of the minimum and maximum ratios provided above.

According to one embodiment, the first portion 101 can include a composite material having a particular ratio between the average grain size of the first phase (GS 1) and the average grain size of the third phase (GS3) facilitating the features of the embodiments herein and making the material suitable for use as an armor component. For example, the first portion 101 can have a grain size ratio (GS1:GS3) of at least about 1.1:1, such as at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, or even at least about 10:1. In another non-limiting embodiment, the grain size ratio (GS1:GS3) can be not greater than about 30:1, such as not greater than about 20:1, not greater than about 15:1, not greater than about 12:1, not greater than about 10:1, not greater than about 9:1, not greater than about 8:1, not greater than about 7:1, no greater than about 6:1, not greater than about 5:1, not greater than about 4:1, not greater than about 3:1, not greater than about 2:1, or even not greater than about 1:1. It will be appreciated that the grain size ratio (GS1:GS3) can be within a range between any of the minimum and maximum ratios provided above.

The first portion 101 including the composite material can have a particular bulk density that may facilitate the features of the first portion according to embodiments herein. For example, the first portion 101 can include a composite material having a bulk density of at least about 2.40 g/cm$^3$, at least about 2.45 g/cm$^3$, at least about 2.50 g/cm$^3$, at least about 2.54 g/cm$^3$, at least about 2.58 g/cm$^3$, or even at least about 2.60 g/cm$^3$. In yet another embodiment, the first portion 101 including the composite material can have a bulk density of not greater than about 3.19 g/cm$^3$, not greater than about 3.10 g/cm$^3$, not greater than about 3.05 g/cm$^3$, not greater than about 3.00 g/cm$^3$, not greater than about 2.95 g/cm$^3$, not greater than about 2.90 g/cm$^3$, not greater than about 2.88 g/cm$^3$. It will be appreciated that the first portion including the composite material may have a bulk density within a range between any of the minimum and maximum values noted above.

The first portion 101 including the composite material can have any of the features described in accordance with the first portion of other embodiments herein, including for example theoretical density, existence of a glassy phase, existence and contents of calcium boride compounds including stoichiometric calcium boride ($CaB_6$) and non-stoichiometric calcium boride ($CaB_x$), orientation of grains, shape of grains, existence of certain compounds such as, but not limited to, aluminum, titanium, boron carbide, and the like.

Moreover, the composite material can be utilized in any of the portions and/or components of the armor components illustrated in FIGS. 1-5.

Items

Item 1. An armor component comprising: a body including: a first portion including at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

Item 2. The armor component of item 1, wherein the first portion comprises at least about 0.1 vol % non-stoichiometric calcium boride ($CaB_x$) for a total volume of the first portion, at least about 0.5 vol %, at least about 0.8 vol %, at least about 1 vol %, at least about 1.5 vol %, at least about 2 vol %, at least about 2.5 vol %, at least about 3 vol %, at least about 3.5 vol %, at least about 4 vol %, at least about 4.5 vol %, at least about 5 vol %, at least about 5.5 vol %, at least about 6 vol %, at least about 6.5 vol %, at least about 7 vol %, at least about 7.5 vol %, at least about 8 vol %, at least about 8.5 vol %, at least about 9 vol %, at least about 9.5 vol %, at least about 10 vol %, at least about 11 vol %, at least about 12 vol %, at least about 13 vol %, at least about 14 vol %, at least about 15 vol %.

Item 3. The armor component of item 1, wherein the first portion comprises not greater than about 99 vol % non-stoichiometric calcium boride ($CaB_x$) for the entire volume of the first portion, not greater than about 95 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 28 vol %, not greater than about 25 vol %, not greater than about 22 vol %, not greater than about 20 vol %, not greater than about 18 vol %, not greater than about 16 vol %, not greater than about 15 vol %, not greater than about 14 vol %, not greater than about 13 vol %, not greater than about 12 vol %, not greater than about 11 vol %, not greater than about 10 vol %, not greater than about 9 vol %, not greater than about 8 vol %, not greater than about 7 vol %, not greater than about 6 vol %, not greater than about 5 vol %, not greater than about 4 vol %.

Item 4. The armor component of item 1, wherein the first portion comprises at least about 0.1 vol % stoichiometric calcium boride ($CaB_6$) for a total volume of the first portion 101, at least about 0.5 vol %, at least about 0.8 vol %, at least about 1 vol %, at least about 1.5 vol %, at least about 2 vol %, at least about 2.5 vol %, at least about 3 vol %, at least about 3.5 vol %, at least about 4 vol %, at least about 4.5 vol %, at least about 5 vol %, at least about 5.5 vol %, at least about 6 vol %, at least about 6.5 vol %, at least about 7 vol %, at least about 7.5 vol %, at least about 8 vol %, at least about 8.5 vol %, at least about 9 vol %, at least about 9.5 vol %, at least about 10 vol %, at least about 11 vol %, at least about 12 vol %, at least about 13 vol %, at least about 14 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, or even at least about 99 vol %.

Item 5. The armor component of item 1, wherein the first portion comprises not greater than about 99 vol % stoichiometric calcium boride ($CaB_6$) for a total volume of the first portion, not greater than about 95 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 28 vol %, not greater than about 25 vol %, not greater than about 22 vol %, not greater than about 20 vol %, not greater than about 18 vol %, not greater than about 16 vol %, not greater than about 15 vol %, not greater than about 14 vol %, not greater than about 13 vol %, not greater than about 12 vol %, not greater than about 11 vol %, not greater than about 10 vol %, not greater than about 9 vol %, not greater than about 8 vol %, not greater than about 7 vol %, not greater than about 6 vol %, not greater than about 5 vol %, not greater than about 4 vol %.

Item 6. The armor component of item 1, wherein the first portion comprises at least about 91 wt % calcium boride compounds, at least about 91 wt % calcium boride compounds, at least about 92 wt % calcium boride compounds, at least about 93 wt % calcium boride compounds, at least about 94 wt % calcium boride compounds, at least about 95 wt % calcium boride compounds, at least about 96 wt % calcium boride compounds, at least about 97 wt % calcium boride compounds, at least about 98 wt % calcium boride compounds, at least about 99 wt % calcium boride compounds.

Item 7. The armor component of item 1, wherein the first portion consists essentially of calcium boride compounds.

Item 8. The armor component of item 1, wherein the calcium boride compounds consist essentially of non-stoichiometric calcium boride ($CaB_x$) and stoichiometric calcium boride ($CaB_6$).

Item 9. The armor component of item 1, wherein the body consists essentially of the first portion.

Item 10. The armor component of item 1, wherein the first portion comprises a ratio ($CaB_6:CaB_x$) of a content of stoichiometric calcium boride ($CaB_6$) to a content of non-stoichiometric calcium boride ($CaB_x$) of not greater than about 1000:1, not greater than about 500:1, not greater than about 300:1, not greater than about 200:1, not greater than about 100:1, not greater than about 95:1, not greater than about 90:1, not greater than about 85:1, not greater than about 80:1, not greater than about 75:1, not greater than about 70:1, not greater than about 65:1, not greater than about 60:1, not greater than about 55:1, not greater than about 50:1, not greater than about 45:1, not greater than about 40:1, not greater than about 35:1, not greater than about 30:1, not greater than about 25:1, not greater than about 20:1, not greater than about 15:1, not greater than about 10:1, not greater than about 5:1, not greater than about 1:1.

Item 11. The armor component of item 1, wherein the first portion comprises a ratio ($CaB_6:CaB_x$) of a content of stoichiometric calcium boride ($CaB_6$) to a content of non-stoichiometric calcium boride ($CaB_x$) of at least about 1:1, at least about 1.5:1, at least about 2:1, at least about 3:1, at least about 4:1, at least about 5:1, at least about 6:1, at least about 7:1, at least about 8:1, at least about 9:1, at least about 10:1, at least about 12:1, at least about 15:1, at least about 18:1, at least about 20:1, at least about 30:1, at least about 40:1, at least about 50:1, at least about 60:1, at least about 70:1, at least about 80:1, at least about 90:1, at least about 100:1, at least about 200:1, at least about 300:1, at least about 400:1, at least about 500:1.

Item 12. The armor component of item 1, wherein at least one of the calcium boride compounds comprises an average grain size of not greater than about 6 microns, not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns.

Item 13. The armor component of item 1, wherein at least one of the calcium boride compounds comprises an average grain size of at least about 0.1 microns, at least about 0.3 microns, at least about 0.5 microns, at least about 0.7 microns, at least about 0.8 microns, at least about 1 micron.

Item 14. The armor component of item 1, wherein the at least one of the calcium boride compounds is stoichiometric calcium boride ($CaB_6$).

Item 15. The armor component of item 1, wherein the at least one of the calcium boride compounds is non-stoichiometric calcium boride ($CaB_x$).

Item 16. The armor component of item 1, wherein the first portion comprises a density of at least about 85% theoretical density, at least about 90% theoretical density, at least about 96.5% theoretical density, at least about 97% theoretical density, at least about 97.5% theoretical density, at least about 98% theoretical density, at least about 98.5% theoretical density, at least about 99% theoretical density.

Item 17. The armor component of item 1, wherein the first portion comprises a bulk density of at least about 2.28 g/cm3, at least about 2.30 g/cm3, at least about 2.32 g/cm3.

Item 18. The armor component of item 1, wherein the first portion comprises a density of not greater than about 3.00 g/cm3, not greater than about 2.90 g/cm3, not greater than about 2.70 g/cm3, not greater than about 2.60 g/cm3.

Item 19. The armor component of item 1, wherein the first portion comprises a glass phase at grain boundaries within the body.

Item 20. The armor component of item 1, wherein the calcium boride compounds include a crystalline phase and an amorphous phase, wherein the crystalline phase comprises stoichiometric calcium boride ($CaB_6$) and non-stoichiometric calcium boride ($CaB_x$).

Item 21. The armor component of item 20, wherein the amorphous phase comprises non-stoichiometric calcium boride ($CaB_x$).

Item 22. The armor component of item 1, wherein the crystalline phase comprises a plurality of crystalline grains having a substantially random orientation relative to each other.

Item 23. The armor component of item 1, wherein the first portion is essentially free of carbon-containing compounds, wherein the first portion is essentially free of boron carbide.

Item 24. The armor component of item 1, wherein the first portion is essentially free of nitride-containing compounds, wherein the first portion is essentially free of aluminum, wherein the first portion is essentially free of titanium.

Item 25. The armor component of item 1, wherein the body consists essentially of the first portion.

Item 26. The armor component of item 1, wherein the body further comprises a second portion, wherein the second portion is coupled to the first portion, wherein the second portion is in direct contact with the first portion, wherein the second portion comprises a material selected from the group consisting of an organic material, an inorganic material, and a combination thereof.

Item 27. The armor component of item 1, wherein the body further comprises a second portion coupled to the first portion, wherein the first portion and the second portion are arranged in a predetermined distribution relative to each other, wherein the first portion defines a first layer and the second portion defines a second layer adjacent to the first layer, wherein the second layer is overlying the first layer, wherein the second layer is abutting the first layer, wherein the second component is interwoven with the first portion.

Item 28. The armor component of item 1, wherein the first portion defines a two-dimensional shape selected from the group consisting of polygons, ellipsoids, circles, complex polygons, irregular shapes, and a combination thereof.

Item 29. The armor component of item 1, wherein the body further comprises a second portion coupled to the first portion, wherein the second portion defines a two-dimensional shape selected from the group consisting of polygons, ellipsoids, circles, complex polygons, irregular shapes, and a combination thereof.

Item 30. The armor component of item 1, wherein the body is part of an object selected from the group consisting of an article of clothing, a vehicle, a water-based vehicle, an aero-based vehicle, a building, a shield, and a combination thereof.

Item 31. The armor component of item 1, wherein the body is sewn into an article of clothing.

Item 32. The armor component of item 1, wherein the body comprises a first major surface, a second major surface, and a side surface extending between the first major surface and the second major surface, wherein the side surface defines a thickness of the body, wherein the body comprises a shape having at least 6 distinct sides, at least 7 distinct sides, at least 8 distinct sides, at least 10 distinct side.

Item 33. The armor component of item 1, wherein the body further comprises a second portion coupled to the first portion, wherein the second portion comprises woven material, wherein the second portion comprises a non-woven material, wherein the second portion comprises a fiber, wherein the second portion comprises a para-aramid fiber, wherein the second portion comprises ballistic fiber, wherein the ballistic fiber includes a natural fiber material, wherein the first portion comprises a synthetic fiber material, wherein the ballistic fiber includes nylon.

Item 34. The armor component of item 1, wherein the first portion comprises a thickness (tfp) of at least about 0.01 microns, at least about 0.1 microns, at least about 1 micron, at least about 5 microns, at least about 10 microns, at least about 20 microns, at least about 30 microns, at least about 50 microns, at least about 100 microns, and wherein the first portion comprises a thickness of not greater than about 20 mm, not greater than about 15 mm, not greater than about 12 mm, not greater than about 10 mm, not greater than about 5 mm.

Item 35. The armor component of item 1, wherein the body comprises a first portion thickness (tfp) and the body further comprises a second portion coupled to the first portion, the second portion having a second portion thickness (tsp), wherein the first portion thickness is substantially the same as the second portion thickness, wherein the first portion thickness is less than the second portion thickness, wherein the first portion thickness is greater than the second portion thickness.

Item 36. The armor component of item 1, wherein the first portion comprises a first portion density (dfp) and the body further comprises a second portion coupled to the first portion, wherein the second portion comprises a second portion density (dsp), wherein the first portion density is substantially the same as the second portion density, wherein the first portion density is less than the second portion density, wherein the first portion density is greater than the second portion density.

Item 37. The armor component of item 1, wherein the first portion comprises a first portion hardness (hfp) and the body further includes a second portion coupled to the first portion, wherein the second portion comprises a second portion hardness (hsp), wherein the first portion hardness is substantially the same as the second portion hardness, wherein the first portion hardness is greater than the second portion hardness, wherein the first portion hardness is less than the second portion hardness.

Item 38. A method for forming an armor component comprising: hot pressing a mixture comprising a raw material to form a first portion of a body comprising at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

Item 39. The method of item 38, wherein hot pressing comprises a first heating of the mixture at a first ramp rate of at least about 2° C./min.

Item 40. The method of item 38, wherein hot pressing includes conducting a first hold for a duration of at least about 10 minutes at a first hold temperature within a range between about 500° C. and about 700° C.

Item 41. The method of item 40, wherein hot pressing further comprises a second heating of the mixture from the first hold temperature to a second hold temperature, wherein the second heating comprises a second heating ramp rate of at least about 10° C./min.

Item 42. The method of item 41, wherein the second hold temperature is within a range between about 1200° C. and about 1600° C.

Item 43. The method of item 41, wherein the mixture is held at the second hold temperature for a duration of at least about 30 minutes and not greater than about 300 minutes.

Item 44. The method of item 41, further comprising applying a pressure of at least about 1000 psi and not greater than about 5000 psi during the second heating.

Item 45. The method of item 41, further comprising cooling after the second heating.

Item 46. The method of item 38, wherein the raw material comprises an average particle size of not greater than about 6 microns, not greater than about 5 microns, not greater than about 4 microns, not greater than about 3 microns, not greater than about 2 microns.

Item 47. The method of item 38, further comprising milling the raw material to change the average particle size of the raw material, wherein milling the raw material comprises reducing the average particle size of the raw material by at least about 5% from the original average particle size of the raw material prior to milling.

Item 48. The method of item 47, wherein milling is conducted with a milling media comprising calcium boride ($CaB_6$).

Item 49. The method of item 38, further comprising sorting the raw material to provide a raw material having an average particle size (D50) of not greater than about 6 microns, and a D90 of not greater than about 20 microns.

Item 50. The method of item 38, wherein the raw material comprises calcium boride (CaB6), wherein the raw material consists essentially of calcium boride.

Item 51. The method of item 38, wherein the raw material comprises an oxygen content of not greater than about 8% for the total weight of the raw material, not greater than about 7%, not greater than about 6%, not greater than about 5%, not greater than about 4%.

Item 52. The method of item 38, wherein the raw material comprises a carbon content of not greater than about 8% for the total weight of the raw material, not greater than about 7%, not greater than about 6%, not greater than about 5%, not greater than about 4%.

Item 53. An armor component comprising: a body including: a first portion including: a first phase comprising silicon carbide (SiC), wherein the first phase has an average grain size (GS1) of not greater than about 6 microns; a second phase comprising calcium boride ($CaB_6$), wherein the second phase has an average grain size (GS2) of not greater than GS1; and a density of at least about 80% theoretical density.

Item 54. The armor component of item 53, wherein the first portion includes a first content (C1) of the first phase and a second content (C2) of the second phase, and wherein C1≥C2.

Item 55. The armor component of item 54, wherein the first portion comprises a first-to-second content ratio of the first content to the second content (C1:C2), and wherein the first-to-second content ratio is at least about 1.1:1, at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, at least about 10:1.

Item 56. The armor component of item 55, wherein the first-to-second content ratio is not greater than about 99:1, not greater than about 97:1, not greater than about 95:1, not greater than about 93:1, not greater than about 90:1.

Item 57. The armor component of item 53, wherein the first portion includes a first content (C1) of the first phase an a second content (C2) of the second phase, and wherein C2≥C1.

Item 58. The armor component of item 57, wherein the first portion comprises a second-to-first content ratio of the second content to the first content (C2:C1), and wherein the second-to-first content ratio is at least about 1.1:1, at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, at least about 10:1.

Item 59. The armor component of item 58, wherein the second-to-first content ratio is not greater than about 99:1, not greater than about 97:1, not greater than about 95:1, not greater than about 93:1, not greater than about 90:1.

Item 60. The armor component of item 53, wherein the first portion comprises a first content (C1) of the first phase of at least about 1 vol % for a total volume of the first portion, wherein C1 is at least about 5 vol %, at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, at least about 98 vol %.

Item 61. The armor component of item 53, wherein the first portion comprises a first content (C1) of the first phase of not greater than about 99 vol % for a total volume of the first portion, wherein C1 is not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, not greater than about 5 vol %.

Item 62. The armor component of item 53, wherein the first portion comprises a second content (C2) of the second phase of at least about 1 vol % for a total volume of the first portion, wherein C2 is at least about 5 vol %, at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, at least about 98 vol %.

Item 63. The armor component of item 53, wherein the first portion comprises a second content (C2) of the second phase of not greater than about 99 vol % for a total volume of the first portion, wherein C2 is not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, not greater than about 5 vol %.

Item 64. The armor component of item 53, wherein GS 1 is not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns.

Item 65. The armor component of item 53, wherein GS 1 is at least about 0.1 microns, at least about 0.3 microns, at least about 0.5 microns, at least about 0.7 microns, at least about 0.8 microns, at least about 1 micron.

Item 66. The armor component of item 53, wherein GS2 is not greater than about 6 microns, not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns.

Item 67. The armor component of item 53, wherein GS2 is at least about 0.1 microns, at least about 0.3 microns, at least about 0.5 microns, at least about 0.7 microns, at least about 0.8 microns, at least about 1 micron.

Item 68. The armor component of item 53, wherein the first portion comprises a grain size ratio (GS1:GS2) of at least about 1.1:1, at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, at least about 10:1.

Item 69. The armor component of item 53, wherein the first portion comprises a grain size ratio (GS1:GS2) of not greater than about 30:1, not greater than about 20:1, not greater than about 15:1.

Item 70. The armor component of item 53, wherein the first portion comprises a density of at least about 81% theoretical density, at least about 85% theoretical density, at least about 90% theoretical density, at least about 96.5% theoretical density, at least about 97% theoretical density, at least about 97.5% theoretical density, at least about 98% theoretical density, at least about 98.5% theoretical density, at least about 99% theoretical density.

Item 71. The armor component of item 53, wherein the first portion comprises a bulk density of at least about 2.40 g/cm3, at least about 2.45 g/cm3, at least about 2.50 g/cm3, at least about 2.54 g/cm3, at least about 2.58 g/cm3, at least about 2.60 g/cm3.

Item 72. The armor component of item 53, wherein the first portion comprises a density of not greater than about 3.19 g/cm3, not greater than about 3.10 g/cm3, not greater than about 3.05 g/cm3, not greater than about 3.00 g/cm3, not greater than about 2.95 g/cm3, not greater than about 2.90 g/cm3, not greater than about 2.88 g/cm3.

Item 73. The armor component of item 53, wherein the first portion comprises a glass phase at grain boundaries within the body.

Item 74. The armor component of item 53, wherein the second phase comprises calcium boride compounds including stoichiometric calcium boride ($CaB_6$) and non-stoichiometric calcium boride ($CaB_x$).

Item 75. The armor component of item 53, wherein the first phase comprises grains having a random orientation with respect to each other.

Item 76. The armor component of item 53, wherein the second phase comprises grains having a random orientation with respect to each other.

Item 77. The armor component of item 53, wherein the first component is essentially free of carbon-containing compounds, wherein the first component is essentially free of boron carbide.

Item 78. The armor component of item 53, wherein the first component is essentially free of nitride-containing compounds, wherein the first component is essentially free of aluminum, wherein the first component is essentially free of titanium.

Item 79. The armor component of item 53, wherein the body consists essentially of the first portion.

Item 80. The armor component of item 53, wherein the body further comprises a second portion, wherein the second portion is coupled to the first portion, wherein the second portion is in direct contact with the first portion, wherein the second portion comprises a material selected from the group consisting of an organic material, an inorganic material, and a combination thereof.

Item 81. The armor component of item 53, wherein the body further comprises a second portion coupled to the first portion, wherein the first portion and the second portion are arranged in a predetermined distribution relative to each other, wherein the first portion defines a first layer and the second portion defines a second layer adjacent to the first layer, wherein the second layer is overlying the first layer, wherein the second layer is abutting the first layer, wherein the second component is interwoven with the first component.

Item 82. The armor component of item 53, wherein the first portion defines a two-dimensional shape selected from the group consisting of polygons, ellipsoids, circles, Roman numerals, Roman alphabet characters, Kanji characters, and a combination thereof.

Item 83. The armor component of item 53, wherein the body further comprises a second portion coupled to the first portion, wherein the second portion defines a two-dimensional shape selected from the group consisting of polygons, ellipsoids, circles, Roman numerals, Roman alphabet characters, Kanji characters, and a combination thereof.

Item 84. The armor component of item 53, wherein the body is part of an object selected from the group consisting of an article of clothing, a vehicle, a water-based vehicle, an aero-based vehicle, a building, a shield, and a combination thereof.

Item 85. The armor component of item 53, wherein the body is sewn into an article of clothing.

Item 86. The armor component of item 53, wherein the body comprises a first major surface, a second major surface, and a side surface extending between the first major surface and the second major surface, wherein the side surface defines a thickness of the body, wherein the body comprises a shape having at least 6 distinct sides, at least 7 distinct sides, at least 8 distinct sides, at least 10 distinct side.

Item 87. The armor component of item 53, wherein the body further comprises a second portion coupled to the first portion, wherein the second portion comprises woven material, wherein the second portion comprises a non-woven material, wherein the second portion comprises a fiber, wherein the second portion comprises a para-aramid fiber, wherein the second portion comprises ballistic fiber, wherein the ballistic fiber includes a natural fiber material, wherein the first component comprises a synthetic fiber material, wherein the ballistic fiber includes nylon.

Item 88. The armor component of item 53, wherein the first portion comprises a thickness (tfp) of at least about 0.01 microns, at least about 0.1 microns, at least about 1 micron, at least about 5 microns, at least about 10 microns, at least about 20 microns, at least about 30 microns, at least about 50 microns, at least about 100 microns, and wherein the first portion comprises a thickness of not greater than about 20 mm, not greater than about 15 mm, not greater than about 12 mm, not greater than about 10 mm, not greater than about 5 mm.

Item 89. The armor component of item 53, wherein the body comprises a first portion thickness (tfp) and the body further comprises a second portion coupled to the first portion, the second portion having a second portion thickness (tsp), wherein the first portion thickness is substantially the same as the second portion thickness, wherein the first portion thickness is less than the second portion thickness, wherein the first portion thickness is greater than the second portion thickness.

Item 90. The armor component of item 53, wherein the first portion thickness is different as compared to the second portion thickness.

Item 91. The armor component of item 89, wherein the second portion thickness is greater than the first portion thickness.

Item 92. The armor component of item 89, wherein the first portion comprises a first portion density (dfp) and the body further comprises a second portion coupled to the first portion, wherein the second portion comprises a second portion density (dsp), wherein the first portion density is substantially the same as the second portion density, wherein the first portion density is less than the second portion density, wherein the first portion density is greater than the second portion density.

Item 93. The armor component of item 53, wherein the first portion density is greater than the second portion density.

Item 94. The armor component of item 92, wherein the second portion density is greater than the first portion density.

Item 95. The armor component of item 92, wherein the first portion comprises a first portion hardness (hfp) and the body further includes a second portion coupled to the first portion, wherein the second portion comprises a second portion hardness (hsp), wherein the first portion hardness is substantially the same as the second portion hardness, wherein the first portion hardness is greater than the second portion hardness, wherein the first portion hardness is less than the second portion hardness.

Item 96. The armor component of item 53, wherein the first portion further includes a third phase comprising boron carbide ($B_4C$).

Item 97 The armor component of item 96, wherein the third phase has an average grain size (GS3) that is different than GS 1.

Item 98. The armor component of item 96, wherein the first portion includes a first content (C1) of the first phase, a second content (C2) of the second phase, and a third content (C3) of the third phase, and wherein $C3 \geq C2$.

Item 99. The armor component of item 96, wherein the first portion comprises a third-to-second content ratio of the third content to the second content (C3:C2), and wherein the third-to-second content ratio is at least about 1.1:1, at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, at least about 10:1.

Item 100. The armor component of item 99, wherein the third-to-second content ratio is not greater than about 99:1, not greater than about 97:1, not greater than about 95:1, not greater than about 93:1, not greater than about 90:1.

Item 101. The armor component of item 96, wherein the first portion includes a first content (C1) of the first phase, a second content (C2) of the second phase, and a third content (C3) of the third phase, and wherein $C3 \geq C1$.

Item 102. The armor component of item 96, wherein the first portion comprises a third-to-first content ratio of the third content to the first content (C3:C1), and wherein the third-to-first content ratio is at least about 1.1:1, at least about 1.3:1, at least about 1.5:1, at least about 1.7:1, at least about 2:1, at least about 2.3:1, at least about 2.5:1, at least about 2.7:1, at least about 3:1, at least about 3.3:1, at least about 3.5:1, at least about 3.7:1, at least about 4:1, at least about 4.3:1, at least about 4.5:1, at least about 4.7:1, at least about 5:1, at least about 5.5:1, at least about 6:1, at least about 6.5:1, at least about 7:1, at least about 8:1, at least about 9:1, at least about 10:1.

Item 103. The armor component of item 102, wherein the third-to-first content ratio is not greater than about 99:1, not greater than about 97:1, not greater than about 95:1, not greater than about 93:1, not greater than about 90:1.

Item 104. The armor component of item 96, wherein the first portion comprises a third content (C3) of the third phase of at least about 1 vol % for a total volume of the first portion, wherein C3 is at least about 5 vol %, at least about 10 vol %, at least about 15 vol %, at least about 20 vol %, at least about 25 vol %, at least about 30 vol %, at least about 35 vol %, at least about 40 vol %, at least about 45 vol %, at least about 50 vol %, at least about 55 vol %, at least about 60 vol %, at least about 65 vol %, at least about 70 vol %, at least about 75 vol %, at least about 80 vol %, at least about 85 vol %, at least about 90 vol %, at least about 95 vol %, at least about 98 vol %.

Item 105. The armor component of item 96, wherein the first portion comprises a third content (C3) of the first phase of not greater than about 99 vol % for a total volume of the first portion, wherein C3 is not greater than about 97 vol %, not greater than about 95 vol %, not greater than about 93 vol %, not greater than about 90 vol %, not greater than about 85 vol %, not greater than about 80 vol %, not greater than about 75 vol %, not greater than about 70 vol %, not greater than about 65 vol %, not greater than about 60 vol %, not greater than about 55 vol %, not greater than about 50 vol %, not greater than about 45 vol %, not greater than about 40 vol %, not greater than about 35 vol %, not greater than about 30 vol %, not greater than about 25 vol %, not greater than about 20 vol %, not greater than about 15 vol %, not greater than about 10 vol %, not greater than about 5 vol %.

Item 106. The armor component of item 96, wherein GS3 is not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns.

Item 107. The armor component of item 96, wherein GS3 is at least about 0.1 microns, at least about 0.3 microns, at least about 0.5 microns, at least about 0.7 microns, at least about 0.8 microns, at least about 1 micron.

Item 108. The armor component of item 96, wherein the first portion comprises a grain size ratio (GS1:GS3) of at least about 1.1:1, at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, at least about 10:1.

Item 109. The armor component of item 108, wherein the first portion comprises a grain size ratio (GS1:GS3) of not greater than about 30:1, not greater than about 20:1, not greater than about 15:1.

Item 110. An armor component comprising: a body including: a first portion including: a first phase comprising silicon carbide (SiC), wherein the first phase has an average grain size (GS1) of not greater than about 6 microns; a second phase comprising calcium boride (CaB6), wherein the second phase has an average grain size (GS2) of not greater than GS 1; a third phase comprising boron carbide (B4C), and a density of at least about 80% theoretical density.

Item 111. The armor component of item 110, wherein the first portion includes a first content (C1) of the first phase, a second content (C2) of the second phase, and a third content (C3) of the third phase, and wherein C3 is at least about 20 wt %, at least about 30 wt %, at least about 40 wt %.

Item 112. The armor component of item 111, wherein C3 is not greater than about 50 wt %.

Item 113. The armor component of item 110, wherein the first portion includes a Vickers Hardness measured at 1 kilogram (HV1 kg) of at least 19 GPa, such as at least 20 GPa, at least 21 GPa, at least 22 GPa.

Item 114. The armor component of item 110, wherein the first portion includes a Vickers Hardness measured at 1 kilogram (HV1 kg) of not greater than 25 GPa, such as not greater than 23 GPa, not greater than 22 GPa.

Item 115. The armor component of item 110, wherein the first portion includes a Vickers toughness measured at 1 kilogram by the Niihara method of at least 5.5 MPa·m1/2, at least 6.0 MPa·m1/2.

Item 116. The armor component of item 110, wherein the first portion includes a Vickers toughness measured at 1 kilogram by the Niihara method of not greater than 7.5 MPa·m1/2, such not greater than 7.0 MPa·m1/2.

Item 117. The armor component of item 110, wherein the first portion 101 can have a particular strength as measured by the 4-point B-bar method of at least about 80 MPa, at least about 90 MPa, at least about 100 MPa.

Item 118. The armor component of item 110, wherein the first portion 101 can have a particular strength as measured by the 4-point B-bar method of not greater than about 125 MPa.

Item 119. The armor component of item 110, wherein the third phase has an average grain size (GS3), and wherein GS3 is not greater than about 5.5 microns, not greater than about 5 microns, not greater than about 4.5 microns, not greater than about 4 microns, not greater than about 3.5 microns, not greater than about 3 microns, not greater than about 2.5 microns, not greater than about 2 microns.

Item 120. The armor component of item 119, wherein GS3 is at least about 0.1 microns, at least about 0.3 microns, at least about 0.5 microns, at least about 0.7 microns, at least about 0.8 microns, at least about 1 micron.

Item 121. The armor component of item 110, wherein the first portion comprises a grain size ratio (GS1:GS3) of at least about 1.1:1, at least about 1.3:1, at least about 1.5:1, at least about 1.7:1, at least about 2:1, at least about 2.5:1, at least about 3:1, at least about 3.5:1, at least about 4:1, at least about 4.5:1, at least about 5:1, at least about 6:1, at least about 7:1, at least about 8:1, at least about 9:1, at least about 10:1.

Item 122. The armor component of item 121, wherein the first portion comprises a grain size ratio (GS1:GS3) of not greater than about 30:1, not greater than about 20:1, not greater than about 15:1.

EXAMPLES

Example 1

A first sample (S1) is formed by providing a raw material of calcium boride having a grit size of between 200 and 600 mesh. The calcium boride is sourced from a supplier or created by reacting submicron $CaCO_3$ and $B_4C$ to obtain $CaB_6$. The raw material powder is formed into a wet mixture using deionized water, ammonia, styrene maleic anhydride, and anti-foaming agent. The wet mixture is milled until the raw material powder has an average particle size within a range between about 0.1 microns and about 3 microns. The wet mixture is removed from the mill, dried and sieved to form a powder. The powder is hot pressed by a first heating of the powder a first ramp rate of 2° C./min to 15° C./min to a first hold temperature within a range between about 500° C. and about 700° C. The powder is held at the first hold temperature for a duration of between about 10 minutes to about 50 minutes. After conducting the first hold, the hot pressing operation continues by increasing the temperature at a second heating ramp rate within a range between about 10° C./min and about 30° C./min to a second hold temperature within a range between about 1200° C. and about 1600° C. The powder is held at the second hold temperature for a duration of between 90 minutes to 300 minutes. After conducting the second hold, the hot pressing operation continues by increasing the temperature at a third heating ramp rate within a range between about 2° C./min and about 15° C./min to a third hold temperature within a range between about 1500° C. and about 1800° C. The powder is held at the second hold temperature for a duration of between 90 minutes to 300 minutes. At the third hold temperature, a pressure within a range between about 1000 psi and about 5000 psi is applied to the sample. After conducting the third hold, the sample was cooled.

Figure 6:
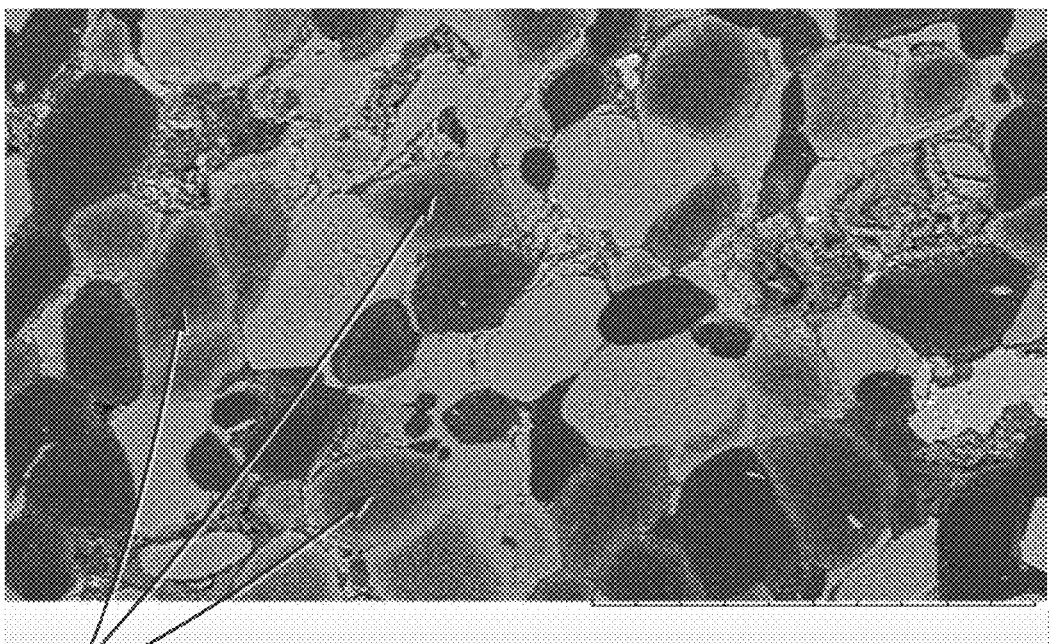
FIG. 6 includes a SEM image of a portion of an armor component in accordance with an embodiment.

FIG. 6 includes a SEM image of the sample of Example 1. Notably, the microstructure demonstrates a diffusion of species with certain grains 601 as evidenced by the shading within some grains, which is evidence of calcium boride compounds including stoichiometric calcium boride and non-stoichiometric calcium boride.

Example 2

A second sample (S2) is formed by providing a raw material of calcium boride having a grit size of between 200 and 600 mesh. The raw material powder is formed into a wet mixture using deionized water, ammonia, styrene maleic anhydride, and an anti-foaming agent. The wet mixture is milled using milling media of silicon carbide until the milled raw material powder has an average particle size within a range between about 0.1 microns and about 3 microns and some content of silicon carbide is included into the calcium boride material. The wet mixture is removed from the mill, dried and sieved to form a powder. The powder is blended and hot pressed by a first heating of the powder a first ramp rate of 2° C./min to 15° C./min to a first hold temperature within a range between about 500° C. and about 700° C. The powder is held at the first hold temperature for a duration of between about 10 minutes to about 50 minutes. After conducting the first hold, the hot pressing operation continues by increasing the temperature at a second heating ramp rate within a range between about 10° C./min and about 30° C./min to a second hold temperature within a range between about 1000° C. and about 1350° C. The powder is held at the second hold temperature for a duration of between 90 minutes to 300 minutes. After conducting the second hold, the hot pressing operation continues by increasing the temperature at a third heating ramp rate within a range between about 2° C./min and about 15° C./min to a third hold temperature within a range between about 1500° C. and about 1800° C. The powder is held at the second hold temperature for a duration of between 90 minutes to 300 minutes. At the third hold temperature, a pressure within a range between about 1000 psi and about 5000 psi is applied to the sample. After conducting the third hold, the sample was cooled.

Figure 7:
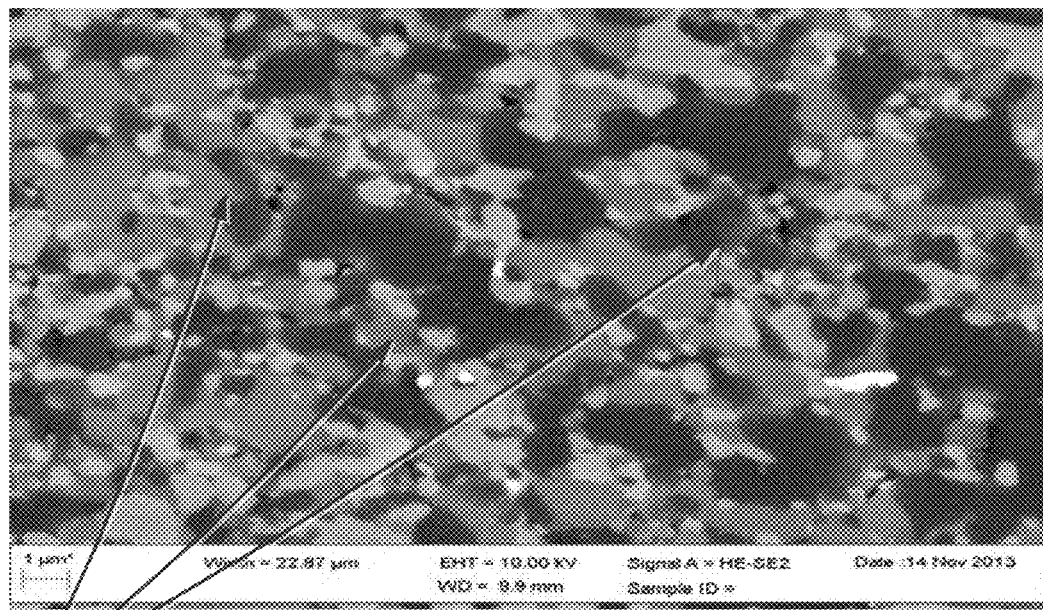
FIG. 7 includes a SEM image of a portion of an armor component in accordance with an embodiment.

FIG. 7 includes a SEM image of the sample of Example 2. The microstructure demonstrates evidence of diffusion boundaries 701, which may include calcium boride compounds including stoichiometric calcium boride and non-stoichiometric calcium boride. The lightest grains are SiC, the other grains include calcium boride compounds, and the variety of intensity demonstrates evidence of stoichiometric and non-stoichiometric forms of calcium boride.

Example 3

A third sample (S3) is formed by providing a raw material of calcium boride having a grit size of between 200 and 600 mesh. The raw material powder is formed into a wet mixture using deionized water, ammonia, styrene maleic anhydride, and anti-foaming agent. The wet mixture is milled using milling media of silicon carbide until the milled raw material powder has an average particle size within a range between about 0.1 microns and about 3 microns and some content of silicon carbide is included into the calcium boride material. The wet mixture is removed from the mill, dried and sieved to form a powder. The powder is blended and hot pressed by a first heating of the powder a first ramp rate of 2° C./min to 15° C./min to a first hold temperature within a range between about 500° C. and about 700° C. The powder is held at the first hold temperature for a duration of between about 10 minutes to about 50 minutes. After conducting the first hold, the hot pressing operation continues by increasing the temperature at a second heating ramp rate within a range between about 10° C./min and about 30° C./min to a second hold temperature within a range between about 1200° C. and about 1400° C., and more particularly between about 1350° C. and about 1400° C. The powder is held at the second hold temperature for a duration of between 90 minutes to 300 minutes. After conducting the second hold, the sample was cooled.

Figure 8:
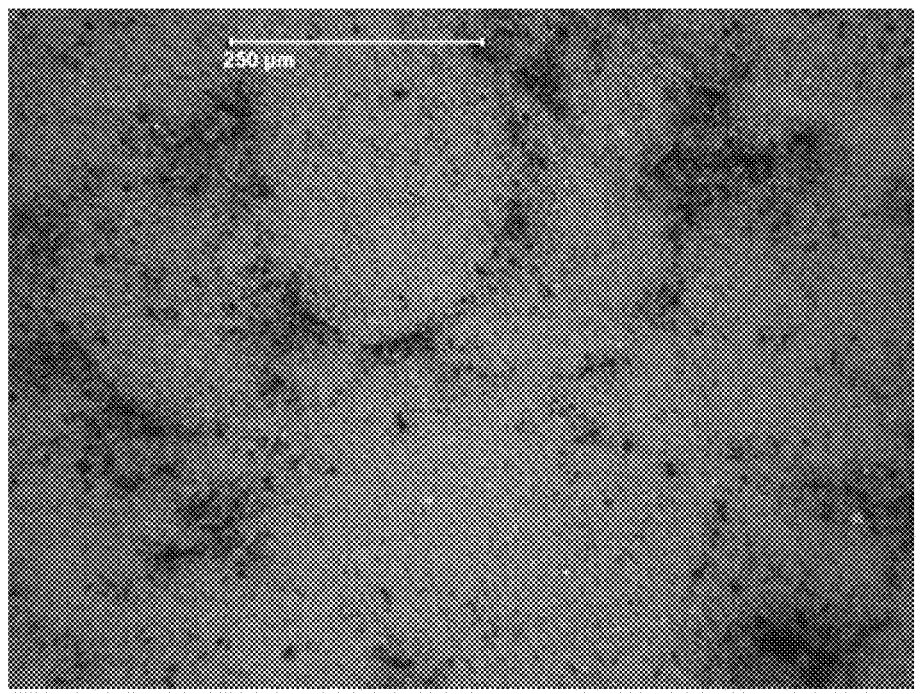
FIG. 8 includes a SEM image of a portion of an armor component in accordance with an embodiment.
Figure 9:
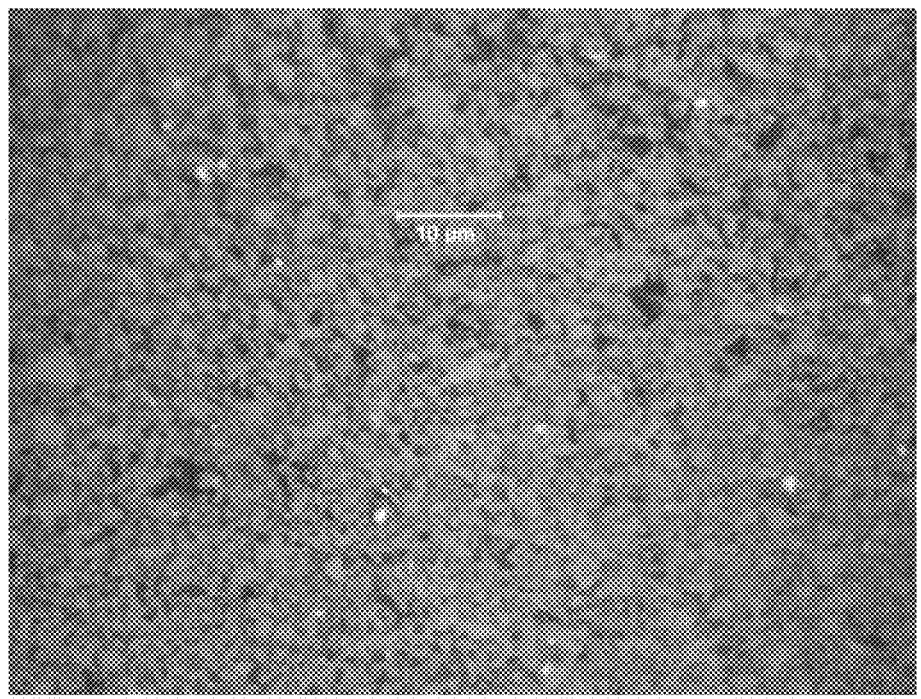
FIG. 9 includes a SEM image of a portion of an armor component in accordance with an embodiment.

FIG. 8 and FIG. 9 include SEM images of the sample of Example 3. Static property measurements of the sample of Example 3 include a Vickers Hardness measured at 1 kilogram ($HV_{1kg}$) within a range of 19 GPa and 25 GPa, Vickers toughness measured at 1 kg by the Niihara method within a range of 5.5 MPa·m$^{1/2}$ and 7.5 MPa·m$^{1/2}$, and a strength as measured by the 4-point B-bar method within a range of 80 MPa and 125 MPa.

The processes and articles of the embodiments herein represent a departure from the state of the art. In particular, the materials herein are useful as armor components due to their unique mechanical characteristics, including but not limited to hardness, toughness, density, elasticity, and the like. Although not wishing to be bound to any particular theory, it is believed that one or more of the features of the ceramic materials of the embodiments herein facilitate their use as an armor component, including for example, grain size, grain size ratios, body shape, contents of phases, placement of phases, stoichiometric and non-stoichiometric compounds, contents and placement of stoichiometric and non-stoichiometric compounds, and other features described herein.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. As used herein, the phrase "consists essentially of" or "consisting essentially of" means that the subject that the phrase describes does not include any other components that may substantially affect the property of the subject.

Further, unless expressly stated to the contrary, "or" refers to an inclusive-or and not to an exclusive- or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, reference to values stated in ranges includes each and every value within that range.

As used herein, the phrase "average particle diameter" can be reference to an average, mean, or median particle diameter, also commonly referred to in the art as D50.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Moreover, not all of the activities described above in the general description or the examples are required, that a portion of a specific activity may not be required, and that one or more further activities can be performed in addition to those described. Still further, the order in which activities are listed is not necessarily the order in which they are performed.

The disclosure is submitted with the understanding that it will not be used to interpret or limit the scope or meaning of the claims. In addition, in the foregoing disclosure, certain features that are, for clarity, described herein in the context of separate embodiments, can also be provided in combination in a single embodiment. Conversely, various features that are, for brevity, described in the context of a single embodiment, can also be provided separately or in any subcombination. Still, inventive subject matter may be directed to less than all features of any of the disclosed embodiments.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

Thus, to the maximum extent allowed by law, the scope of the present invention is to be determined by the broadest permissible interpretation of the following claims and their equivalents, and shall not be restricted or limited by the foregoing detailed description.

What is claimed is:

1. An armor component comprising:
    a body comprising at least about 90 wt % calcium boride compounds and having a density of at least about 80% theoretical density, wherein the calcium boride compounds include non-stoichiometric calcium boride ($CaB_x$) and stoichiometric calcium boride ($CaB_6$).

2. The armor component of claim 1, wherein the body is essentially free of aluminum.

3. The armor component of claim 1, wherein the body comprises a ratio ($CaB_6$:$CaB_x$) of a content of stoichiometric calcium boride ($CaB_6$) to a content of non-stoichiometric calcium boride ($CaB_x$) of not greater than about 1000:1 and at least about 1:1.

4. The armor component of claim 1, wherein the body comprises a density of at least about 96.5% theoretical density.

5. The armor component of claim 1, wherein the body comprises a glass phase at grain boundaries within the body.

6. The armor component of claim 1, wherein the body is essentially free of carbon containing compounds.

7. The armor component of claim 1, wherein the body comprises a first phase comprising silicon carbide (SiC) and a second phase comprising calcium boride ($CaB_6$).

8. The armor component of claim 7, wherein the first phase has an average grain size (GS1) of not greater than about 6 microns; wherein the second phase has an average grain size (GS2) of not greater than GS1.

9. The armor component of claim 8, wherein the body further includes a third phase comprising boron carbide ($B_4C$).

10. The armor component of claim 1, wherein the body includes a Vickers Hardness measured at 1 kilogram (HV1 kg) of at least 19 GPa and not greater than 25 GPa.

11. The armor component of claim 1, wherein the body includes a Vickers toughness measured at 1 kilogram by the indention method of at least 5.5 $MPa \cdot m^{1/2}$ and not greater than 7.5 $MPa \cdot m^{1/2}$.

12. The armor component of claim 1, wherein the body is essentially free of free silicon.

13. The armor component of claim 9, wherein the third phase has an average grain size (GS3) of not greater than GS1.

14. The armor component of claim 1, wherein the body is essentially free of nitride-containing compounds.

15. The armor component of claim 1, wherein at least one of the calcium boride compounds comprises an average grain size (D50) of not greater than about 6 microns.

16. The armor component of claim 1, wherein the body is part of an object selected from the group consisting of an article of clothing, a vehicle, a water-based vehicle, an aero-based vehicle, a building, a shield, and a combination thereof.

* * * * *